(12) United States Patent
Routt et al.

(10) Patent No.: US 12,207,159 B2
(45) Date of Patent: Jan. 21, 2025

(54) QUANTUM ARTIFICIAL INTELLIGENCE POSITIONING SYSTEM IN A NEXT GENERATION PUBLIC SAFETY NETWORK

(71) Applicants: AT&T Intellectual Property I, L.P., Atlanta, GA (US); AT&T Mobility II LLC, Atlanta, GA (US)

(72) Inventors: Thomas J. Routt, Sequim, WA (US); Mark Stockert, San Antonio, TX (US)

(73) Assignees: AT&T Intellectual Property I, L.P., Atlanta, GA (US); AT&T Mobility II LLC, Atlanta, GA (US)

( * ) Notice: Subject to any disclaimer, the term of this patent is extended or adjusted under 35 U.S.C. 154(b) by 352 days.

(21) Appl. No.: 17/734,632

(22) Filed: May 2, 2022

(65) Prior Publication Data

US 2023/0353982 A1    Nov. 2, 2023

(51) Int. Cl.
*H04W 4/029* (2018.01)
*G06N 10/20* (2022.01)
*G06N 10/60* (2022.01)

(52) U.S. Cl.
CPC ............ *H04W 4/029* (2018.02); *G06N 10/20* (2022.01); *G06N 10/60* (2022.01)

(58) Field of Classification Search
CPC ........ H04W 4/02; H04W 4/029; G06N 10/20; G06N 10/60
See application file for complete search history.

(56) References Cited

U.S. PATENT DOCUMENTS

| | | | |
|---|---|---|---|
| 2020/0242984 A1* | 7/2020 | Salem | B64B 1/58 |
| 2022/0335324 A1* | 10/2022 | Zhang | G06N 10/40 |
| 2023/0027380 A1* | 1/2023 | Sutton-Shearer | H04L 9/3213 |
| 2023/0092245 A1* | 3/2023 | Saroiu | H04W 12/03 726/22 |

OTHER PUBLICATIONS

Stockert, Mark et al., "System and Method for Managing Communication Networks With Quantum Blockchains", U.S. Appl. No. 17/498,229, filed Oct. 11, 2021, 56 pages.

\* cited by examiner

*Primary Examiner* — Jinsong Hu
*Assistant Examiner* — Farideh Madani
(74) *Attorney, Agent, or Firm* — Guntin & Gust, PLC; Robert Gingher

(57) ABSTRACT

Aspects of the subject disclosure may include, for example, a device including a processing system including a processor; and a memory that stores executable instructions that, when executed by the processing system, facilitate performance of operations of receiving a smart contract for tracking a position of a mobile device from a quantum blockchain; issuing a token uniquely identifying location data for the position of the mobile device; receiving location data including the token from the mobile device, wherein the position of the mobile device is determined by displacement from an initial position using a quantum accelerometer; verifying the location data using the token; and storing the location data in the quantum blockchain. Other embodiments are disclosed.

20 Claims, 13 Drawing Sheets

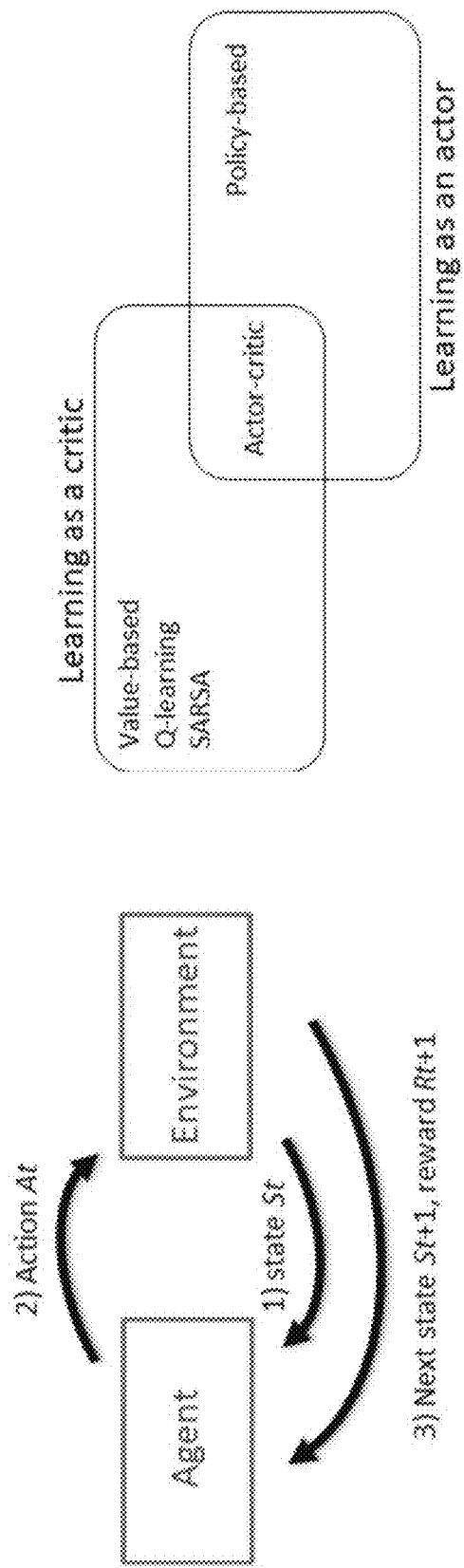
FIG. 2C
FIG. 2D
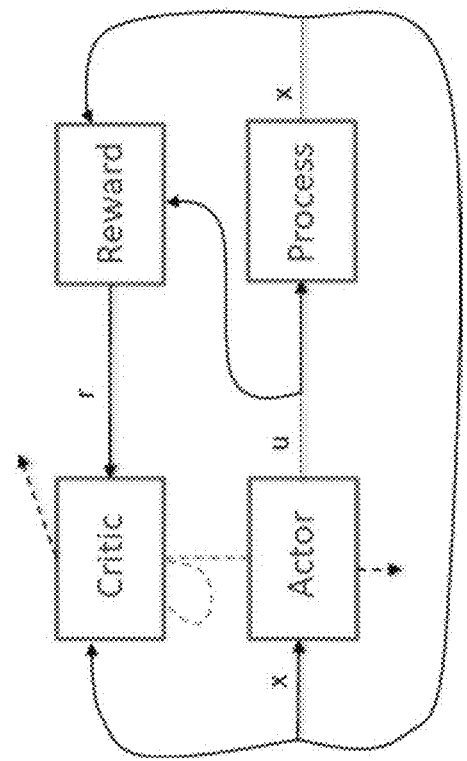
FIG. 2E

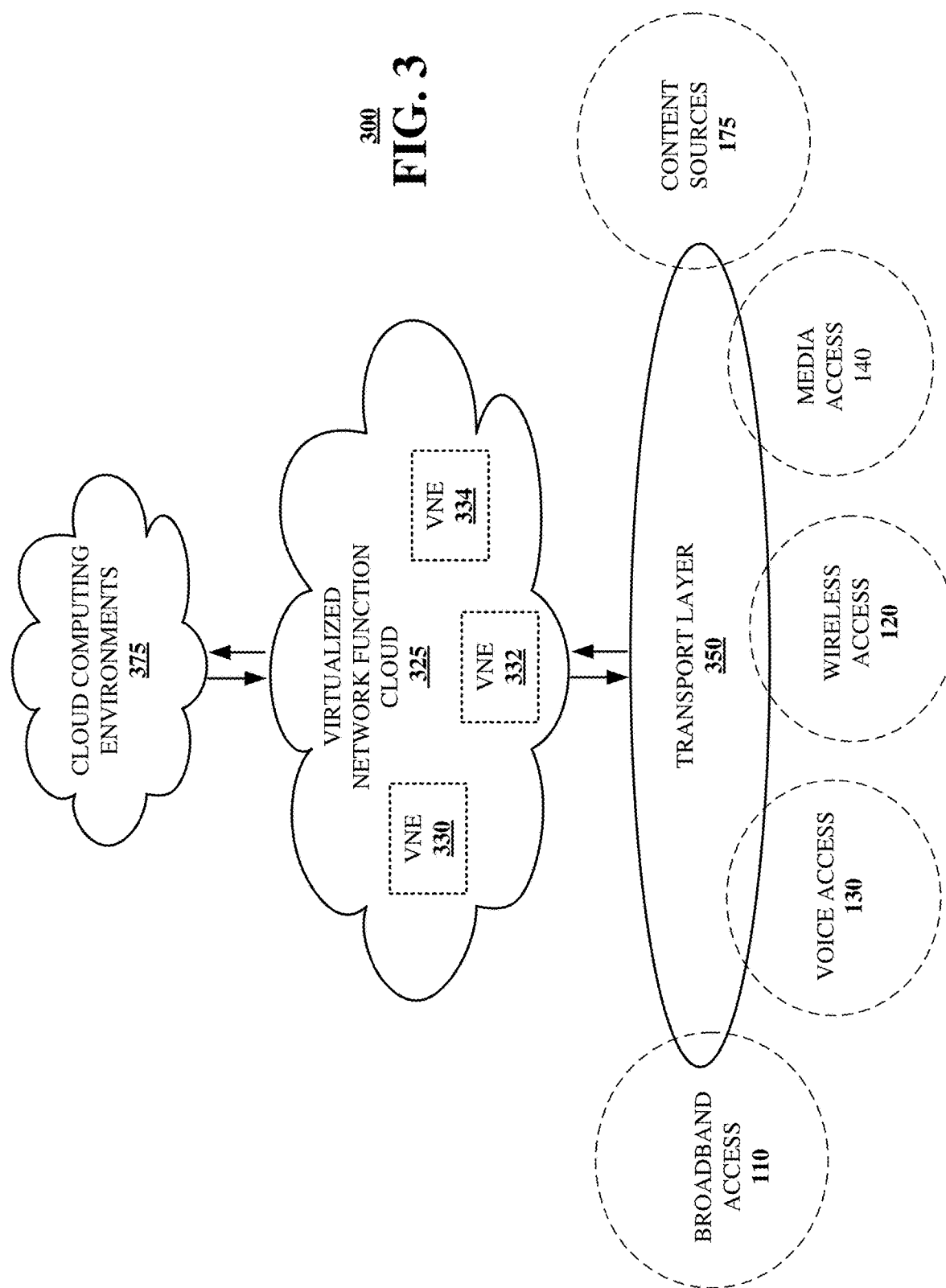

QUANTUM ARTIFICIAL INTELLIGENCE POSITIONING SYSTEM IN A NEXT GENERATION PUBLIC SAFETY NETWORK

FIELD OF THE DISCLOSURE

The subject disclosure relates to a quantum artificial intelligence positioning system in a next generation public safety network.

BACKGROUND

Widespread deployment of wireless technology has enabled a large number of location-based services. Position determination and tracking of locations are critical for these services in emergencies. Accuracy, reliability, and scalability are challenges for existing methods.

During public safety incidents first responders, public safety entities (PSEs) and public safety agencies (PSAs) need to continually track and communicate to ensure a coordinated incident response resulting in better outcomes. The location of first responders is a foundational public safety requirement, including for example, while in vehicles, on a foot chase, involved in search-and-rescue operations, fighting wildfires, restoring communications in the wake of a flood or earthquake, or inside a high-rise building responding to an incident. Artificial Intelligence (AI) driven "Big Data" analytics can inform predictive/prescriptive, proactive optimization of public safety mobile networks and attendant location-based services resulting in improved situational awareness.

Location-based services and attendant situational awareness predominantly in use by public safety are based on the U.S. Department of Defense Global Positioning System (GPS) for navigation and time synchronization. GPS generally consists of a core constellation of 31 operational satellites in medium earth orbit (MEO) at altitudes of approximately 20,200 km (~12,550 miles) arranged into six equally spaced orbital planes, where each plane contains four "slots" occupied by 24 baseline satellites (more recently operating as a 27-slot core constellation), ensuring viewability of at least four GPS satellites from essentially all planetary locations.

User receipt of four GPS satellite signals and satellite space-time coordinates at time of transmission enable solving for unknown space-time coordinates based on trilateration, where received signals are continuous-wave circularly polarized radio frequency (RF) signals resident on two carrier frequencies in the L-band centered about ~1575.42 MHz and ~1227.6 MHz. Carrier frequency signals are modulated by a pseudorandom noise (PRN) code, and GPS receivers conduct phase-difference measurements (pseudo range measurements, the phase difference between received PRN codes and identical copies of PRN codes replicated within GPS receivers) to determine location.

Highly accurate atomic clocks are used to synchronize telecommunications networks, GPS satellite navigation and positioning systems. Positioning and navigation systems rely on GPS satellite and/or RF signals that may be blocked by buildings or other infrastructure, or can be jammed, spoofed, or denied thus preventing accurate navigation and positioning. Hence, GPS signals are only available outdoors. Indoor locations or areas with signal blockage require other methods to accurately determine position. Fingerprinting-based positioning methods rely on RF Received Signal Strength (RSS) values from a variety of RF sources (Bluetooth, Wi-Fi, 4G/5G, ZigBee, etc.) to estimate position. However, these methods rely on unpredictable radio propagation characteristics in indoor environments and areas with limited radio coverage which limit position accuracy.

Quantum accelerometers are the main component of quantum inertial navigation systems are self-contained systems that do not rely on external signals (GPS, RF, etc.), and measure how an object's velocity changes over time through use of quantum tunneling, quantum interferometry, or other methods to measure acceleration. Micro-chip quantum tunneling, or other chip-level quantum accelerometers, may also be used.

BRIEF DESCRIPTION OF THE DRAWINGS

Reference will now be made to the accompanying drawings, which are not necessarily drawn to scale, and wherein:

FIG. 2C illustrates a basic model of reinforced learning.

FIG. 2D illustrates categories of reinforced learning.

FIG. 2E illustrates a schematic structure of reinforced learning in the actor-critic model.

FIG. 3 is a block diagram illustrating an example, non-limiting embodiment of a virtualized communication network in accordance with various aspects described herein.

DETAILED DESCRIPTION

Figure 1:
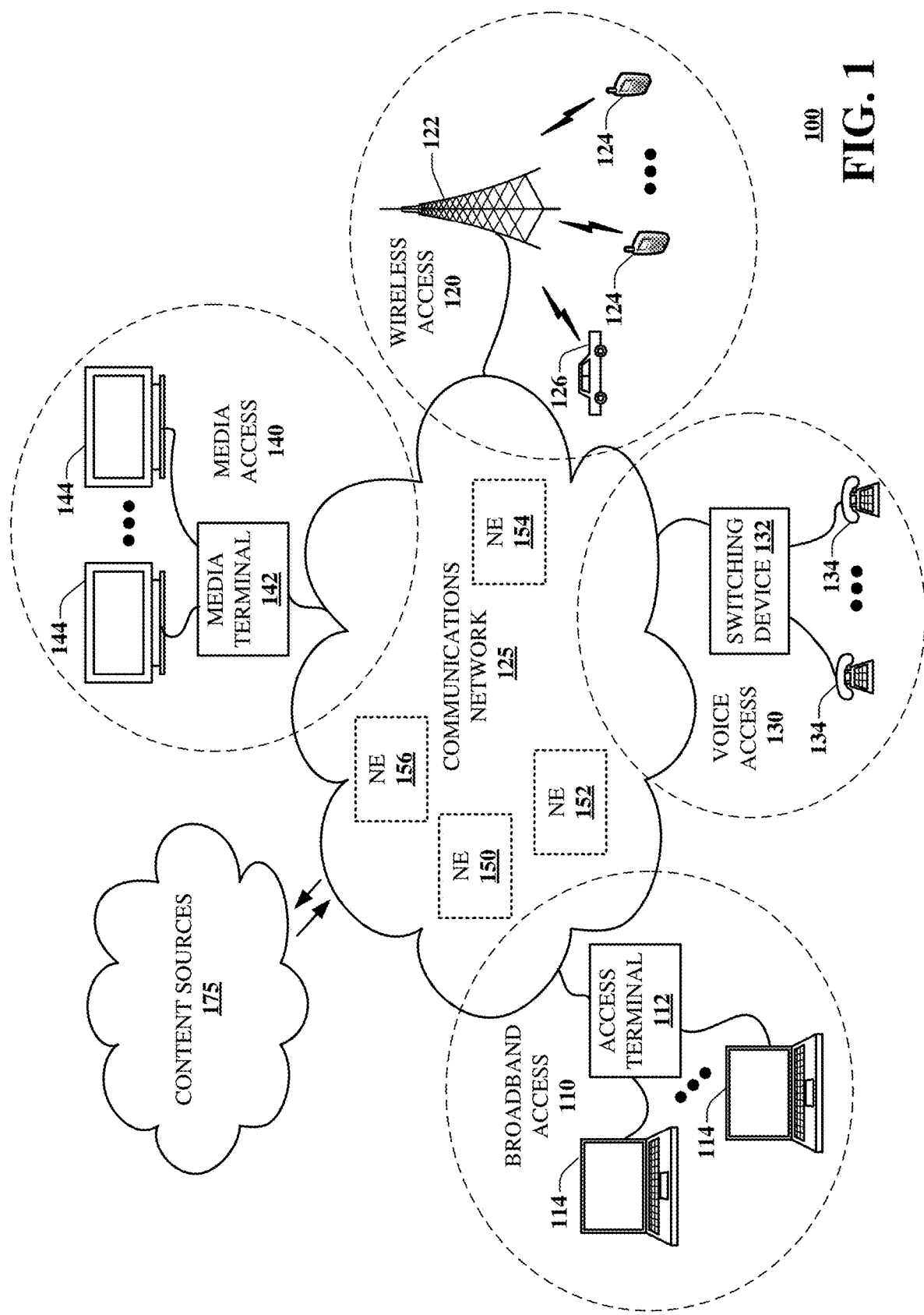
FIG. 1 is a block diagram illustrating an exemplary, non-limiting embodiment of a communications network in accordance with various aspects described herein.

The subject disclosure describes, among other things, illustrative embodiments for a quantum artificial intelligence positioning system in a next generation public safety network. Described herein is a new system and method to provide enhanced, multi-dimensional location services and situational awareness; actionable predictive and prescriptive data analytics directed to optimize low-latency, priority access, quality of service, non-preemption, end-to-end application throughput; dynamically optimized logical and physical mobile network topologies; and integrated communications and sensing technologies on behalf of public safety first responders operating within quantum and hybrid quantum-classical next-generation mobile networks based on native, on-demand Quantum Positioning System (QPS), Quantum AI (QAI), Quantum Machine Learning (QML), Quantum Reinforcement Learning (QRL), Quantum/Classical Federated Reinforcement Learning (QCFRL), and quantum blockchain technologies. Other embodiments are described in the subject disclosure.

One or more aspects of the subject disclosure include a device including a processing system including a processor; and a memory that stores executable instructions that, when executed by the processing system, facilitate performance of operations of receiving a smart contract for tracking a position of a mobile device from a quantum blockchain; issuing a token uniquely identifying location data for the position of the mobile device; receiving location data including the token from the mobile device, wherein the position of the mobile device is determined by displacement from an initial position using a quantum accelerometer; verifying the location data using the token; and storing the location data in the quantum blockchain.

One or more aspects of the subject disclosure include a non-transitory, machine-readable medium, comprising executable instructions that, when executed by a processing system including a processor, facilitate performance of operations including receiving a smart contract for tracking a position of a mobile device from a quantum blockchain; issuing a token uniquely identifying location data for the position of the mobile device; fixing an initial position of the mobile device; receiving location data including the token from the mobile device, wherein the position of the mobile device is determined by displacement from the initial position using a quantum accelerometer; verifying the location data using the token; and storing the location data in the quantum blockchain.

One or more aspects of the subject disclosure include a method of requesting, by a processing system including a processor, a smart contract for tracking a position of a mobile device from a quantum blockchain; issuing, by the processing system, a token uniquely identifying location data for the position of the mobile device responsive to receiving the smart contract; receiving, by the processing system, the location data including the token from the mobile device, wherein the position of the mobile device is determined by displacement from an initial position using a quantum accelerometer; verifying, by the processing system, the location data using the token; and storing, by the processing system, the location data in the quantum blockchain.

Fifth Generation (5G) mobile network deployments are driven by data-intensive business models and requirements to support extreme mobility and hyper-connectivity. Such 5G mobile network deployments are rapidly proliferating throughout the world and deliver a wide range of capabilities relative to prior generations including for example, Enhanced Mobile Broadband (eMBB) with maximum data rates up to 20 Gbps, Ultra-reliable Low Latency (URLLC) with latency as low as 1 msec, high availability and high reliability, massive Machine Type Communication (mMTC) with connection densities as high as 106 per square km, and extended device battery life over wide coverage areas.

Continuing mobile network technology evolution is informing next generation standards development in International Telecommunication Union (ITU) international mobile technology (IMT), Standards Developing Organizations (SDOs), and Third Generation Partnership Project (3GPP). Requirements under consideration/development include on-demand topology; 3D connectivity; integration of communications and sensing technologies; ultra-high-speed, high-capacity, low-latency connectivity; space-air-ground integrated networking (SAGIN); advanced network virtualization; pervasive on-demand artificial intelligence (AI); and pervasive multi-dimensional locational services and situational awareness, all of which impact public safety.

First responders rely on highly-available, low-latency-access communications and network infrastructures and location-based situational awareness, reflecting the overarching public safety community's requirement to respond to the entire spectrum of routine, emergency, and disaster emergency scenarios—both natural and synthetic—at a moment's notice. Rapid, real-time data collection and actionable analytics based on collected data are equally central to a first responder's immediate, properly directed responses.

Most disasters occur without warning, and all require a rapid and flawless response, with no room for error. Timely, multi-disciplinary, coordinated responses across agency lines is mission-critical to protect the communities' and citizens' public safety that first responders are charged to serve. Whether the event is a fire, natural disaster (i.e., hurricane, earthquake, forest fire, flood, commercial disaster), vehicular collision, search and rescue operation, act of terrorism, or apprehension of suspects, highly available, low access-latency networks, real-time data collection, real-time three-dimensional (3D) location-based situational awareness, and actionable analytics provide the common denominator to successful first-responder rapid response.

During public safety incidents, first responders, public safety entities (PSEs) and public safety agencies (PSAs) need to continually track and intercommunicate to ensure a coordinated incident response resulting in better outcomes. Locations of first responders is a foundational public safety requirement, including for example, while in vehicles, on a foot chase, involved in search-and-rescue operations, fighting wildfires, restoring communications in the wake of a flood or earthquake, or inside a high-rise building responding to an incident.

Mobile location systems rely on measurements of RF signals emitted by base stations and/or satellite signals (GPS, etc.) whose position is assumed to be ground truth. Current location systems require a fixed signal frequency (RF, GPS, Wi-Fi, etc.). Location security and accuracy is compromised however based on location-based systems vulnerabilities to:

Blocking, jamming or tampering with RF signals resulting in disruption of positional accuracy;

Cracking of encoding resulting in RF signal spoofing;

Convincing users and equipment that RF signals are in a different position than ground truth;

Hijacking locations via spoofing.

First Responders increasingly rely on accurate ground truth position within a plurality of emergency use cases that include the following:

Trajectory inference from location, direction and velocity to predict traffic demand, next location, autonomous vehicle operation, etc.;

Control and accurate positioning of drones as temporary base stations when disaster site network resources are down, while tracking first responder and other locations, and while managing other drones;

Mobile users (UEs) location prediction to help with first responder route planning and vehicle dispatching;

Routing around traffic congestion, disable vehicles, disaster damage, etc.;

Optimizing first responder resources for incidents, i.e., predicting number of vehicles, personnel, routing, locations.

First Responder location services and situational awareness are often compromised however due to any one or combination of the following: First Responders are not equipped with supportive mobile devices; do not have access to a mobile app that provides reliable, real-time location; do not have access to requisite technology to provide reliable location services and situational awareness indoors/within high-rise buildings and/or within urban canyons; PSE/PSA reliance on siloed applications; and vulnerability of GPS signals to jamming and spoofing which can potentially disable navigation systems.

Next generation mobile networks are projected to provide an increase of ~100× in volumetric spectral and energy efficiency (bps/Hz/m3) relative to 5G networks and to incorporate a massive connectivity-based structure. Next generation mobile networks will be required to enable the following at a minimum:

Very High Bandwidth to enable for example, high-fidelity holographic immersive communications, wireless data centers, multi-THz frequencies, and multi-Tbps uplink/downlink (UL/DL) speeds.

Very Wide Coverage to support Massive Scale IoT networks with multi-Gbps-to-Tbps coverage everywhere within proximal and remote areas.

Enhanced Reliability. Whereas 5G minimum reliability requirements include successful transmission of a 32-byte layer 2 (L2) packet within 1 ms at 1-105 and "four-to-five 9s" (99.99% to 99.999%) availability, certain next generation applications (i.e., remote robotic haptic surgery, digital twins (virtualization model of a physical process, product or service; pairing of the virtual and physical worlds to enable monitoring/data analysis to predict performance and anticipate problems before they occur), tactile/haptic communications, government/national security, First Responder/Emergency Services) will require reliability and redundancy that range upward from "four-to-five 9s."

High Endpoint Density incorporating for example, up to 10 million devices/km², driving requirements for Quantum AI to continuously optimize in real time among apparently competing scheduling, beam/link adaptation, and interference coordination/mitigation resources.

Hyper-Synchronization of Multiple, Parallel Flows to Multiple Devices supporting synchronized parallel media streams that originate from a plurality of network endpoints and midpoints.

Extremely Low Power Consumption for resource-constrained devices.

Time-Sensitive Operations (i.e., bounded latency, jitter).

Tactile Internet—evolution of the Internet of Things (IoT)—incorporating human-to-machine and machine-to-machine real-time interactive communications, enabling for example, remote robotic surgery with haptic robots.

Smartdust, system of multiple micro-electromechanical system (MEMS) such as sensors and robots, which can detect vibration, light, temperature, magnetism, chemicals.

Quantum Electromechanical System (QEMS); nano-fabricated mechanical systems that incorporate transducers operating at the quantum limit (limit on measurement accuracy at quantum scales) to detect for example, magnetic moment of a single spin and deformation forces on a single macromolecule, with applications directed to information and biomolecular technologies.

Holographic Communications to enable fully immersive user experiences virtually, where a key component is the interactive transmission of 3D holographic images between/among one/multiple sources to one/multiple endpoints.

Ubiquitous Services (Land, Air, Space, Sea) based on a seamlessly integrated connectivity architecture consisting for example, of land-, sea-, air-, and space-based nodes. Includes 'z' axis added to 2D surface-based (x-y axes) routing/switching infrastructures to generate real-time 3D (x, y, z) axes location-based situational awareness.

Cyber-Physical Systems/Manufacturing that integrate the digital world and real world, where intelligent objects interconnect and interact, i.e., Massive Internet of Things (MIoT).

Ubiquitous First Responder/Emergency Services. Directed to universally available, dependable, resilient, ubiquitous, network-agnostic communications frameworks providing data, video, voice, graphical, image integration. Addresses on-demand temporal coverage, network redundancy, in-building solutions, location-centric on-demand capacity, support for Mission Critical, Push-To-Talk (MC-PTT), MC-Data, MC-Video. Incorporates remotely controlled and autonomous assets such as connected vehicles, drones, robots within an Emergency Services architecture.

Precise Location Tracking to enable for example, precise location/tracking of user devices, vehicles, tracking along six degrees of freedom for Virtual Reality/Augmented Reality/Mixed Reality (VR/AR/MR), holographic communications tracking, to include the three dimensions of spatial movement along x-y-z axes, plus pitch, yaw, and rotation, and highly integrated space-air-ground integrated networking (SAGIN) tracking of public safety, first responder assets (personnel, vehicles, user equipment).

Next generation mobile networks will increasingly require quantum and hybrid quantum-classical communications to facilitate connecting a plurality of end-to-end (ETE) quantum and hybrid quantum-classical networked application resources, i.e., application programs, application programming interfaces (APIs), application servers, security servers, data repositories/lakes, routers, switches, load balancers, links, etc.

Referring now to FIG. 1, a block diagram is shown illustrating an example, non-limiting embodiment of a system 100 in accordance with various aspects described herein. For example, system 100 can facilitate in whole or in part requesting smart contracts for tracking a position of a mobile device from a quantum blockchain; issuing tokens for uniquely identifying location data for the position of mobile devices; receiving location data including the token from the mobile device, determining position a mobile device by displacement from an initial position using a quantum accelerometer; verifying location data; and storing location data in a quantum blockchain. In particular, a communications network 125 is presented for providing broadband access 110 to a plurality of data terminals 114 via access terminal 112, wireless access 120 to a plurality of mobile devices 124 and vehicle 126 via base station or access point 122, voice access 130 to a plurality of telephony devices 134, via switching device 132 and/or media access 140 to a plurality of audio/video display devices 144 via media terminal 142. In addition, communication network 125 is coupled to one or more content sources 175 of audio, video, graphics, text and/or other media. While broadband access 110, wireless access 120, voice access 130 and media access 140 are shown separately, one or more of these forms of access can be combined to provide multiple access services to a single client device (e.g., mobile devices 124 can receive media content via media terminal 142, data terminal 114 can be provided voice access via switching device 132, and so on).

The communications network 125 includes a plurality of network elements (NE) 150, 152, 154, 156, etc. for facilitating the broadband access 110, wireless access 120, voice access 130, media access 140 and/or the distribution of content from content sources 175. The communications network 125 can include a circuit switched or packet switched network, a voice over Internet protocol (VoIP) network, Internet protocol (IP) network, a cable network, a passive or active optical network, a 4G, 5G, or higher generation wireless access network, WIMAX network, UltraWideband network, personal area network or other wireless access network, a broadcast satellite network and/or another communications network.

In various embodiments, the access terminal 112 can include a digital subscriber line access multiplexer (DSLAM), cable modem termination system (CMTS), optical line terminal (OLT) and/or other access terminal. The data terminals 114 can include personal computers, laptop computers, netbook computers, tablets or other computing devices along with digital subscriber line (DSL) modems, data over coax service interface specification (DOCSIS) modems or other cable modems, a wireless modem such as a 4G, 5G, or higher generation modem, an optical modem and/or other access devices.

In various embodiments, the base station or access point 122 can include a 4G, 5G, or higher generation base station, an access point that operates via an 802.11 standard such as 802.11n, 802.11ac or other wireless access terminal. The mobile devices 124 can include mobile phones, e-readers, tablets, phablets, wireless modems, and/or other mobile computing devices.

In various embodiments, the switching device 132 can include a private branch exchange or central office switch, a media services gateway, VoIP gateway or other gateway device and/or other switching device. The telephony devices 134 can include traditional telephones (with or without a terminal adapter), VoIP telephones and/or other telephony devices.

In various embodiments, the media terminal 142 can include a cable head-end or other TV head-end, a satellite receiver, gateway or other media terminal 142. The display devices 144 can include televisions with or without a set top box, personal computers and/or other display devices.

In various embodiments, the content sources 175 include broadcast television and radio sources, video on demand platforms and streaming video and audio services platforms, one or more content data networks, data servers, web servers and other content servers, and/or other sources of media.

In various embodiments, the communications network 125 can include wired, optical and/or wireless links and the network elements 150, 152, 154, 156, etc. can include service switching points, signal transfer points, service control points, network gateways, media distribution hubs, servers, firewalls, routers, edge devices, switches and other network nodes for routing and controlling communications traffic over wired, optical and wireless links as part of the Internet and other public networks as well as one or more private networks, for managing subscriber access, for billing and network management and for supporting other network functions.

Figure 2A:
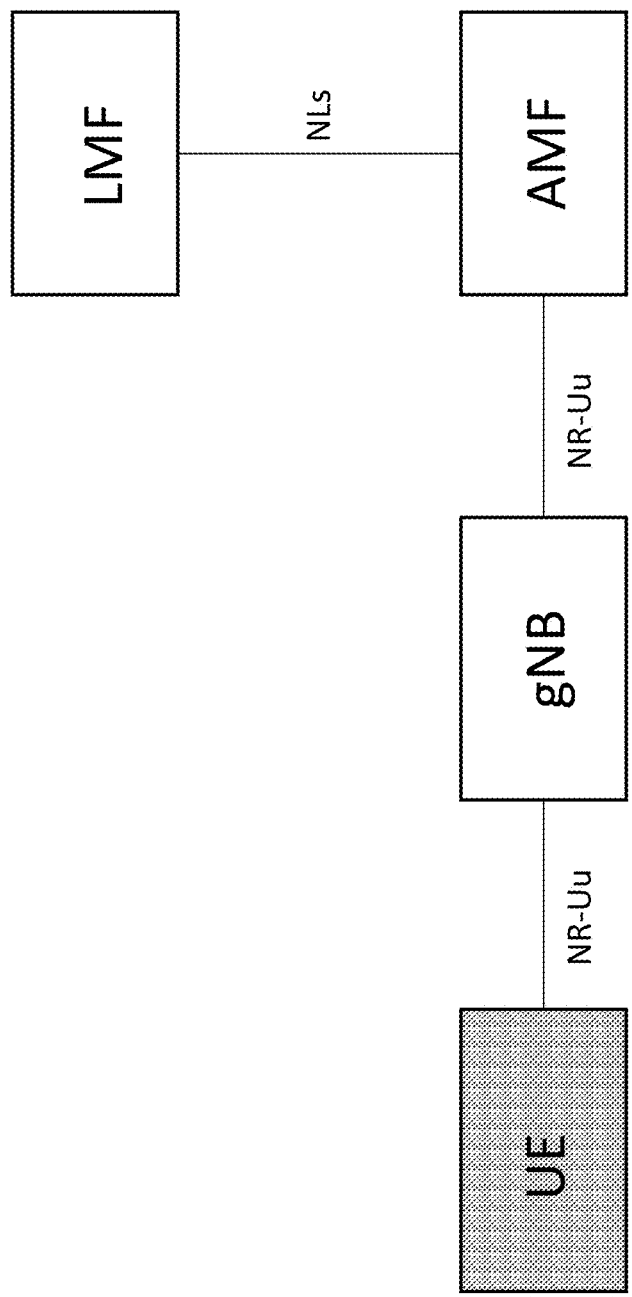
FIG. 2A is a block diagram illustrating an example of user equipment position determining.

FIG. 2A is a block diagram illustrating an example of user equipment position determining. The 3GPP standard Release 16 specifies positioning signals and measurements for 5G new radio (NR) where the next generation Node B (gNB) exchanges the necessary positioning information and measurements with the Location Management Function (LMF) in the 5G core network via the NR Positioning Protocol Annex (NRPPa) protocol. LMF receives measurements and assistance information from the next generation (NG) radio access network (RAN) and user equipment (UE—i.e., a mobile device) via access and mobility management function (AMF) over an NLs interface to compute UE position.

With the new next generation interface between the NG RAN and the core network, a new NR positioning protocol A (NRPPa) is introduced to carry the positioning information between NG-RAN and LMF over the next generation control plane interface (NG-C). These additions in the 5G architecture provide the framework for positioning in 5G. The LMF configures the UE using the LTE positioning protocol (LPP) via AMF. The NG RAN configures the UE using radio resource control (RRC) protocol over LTE-Uu and NR-Uu, as shown in FIG. 2A.

To enable more accurate positioning measurements than LTE, new reference signals were added to the NR specifications. These signals are the positioning reference signal (NR PRS) in the downlink and the sounding reference signal (SRS) for positioning in the uplink. The downlink positioning reference signal (PRS) is the main reference signal supporting downlink-based positioning methods. Although other signals can be used, PRS is specifically designed to deliver the highest possible levels of accuracy, coverage, and interference avoidance and suppression.

Figure 2B:
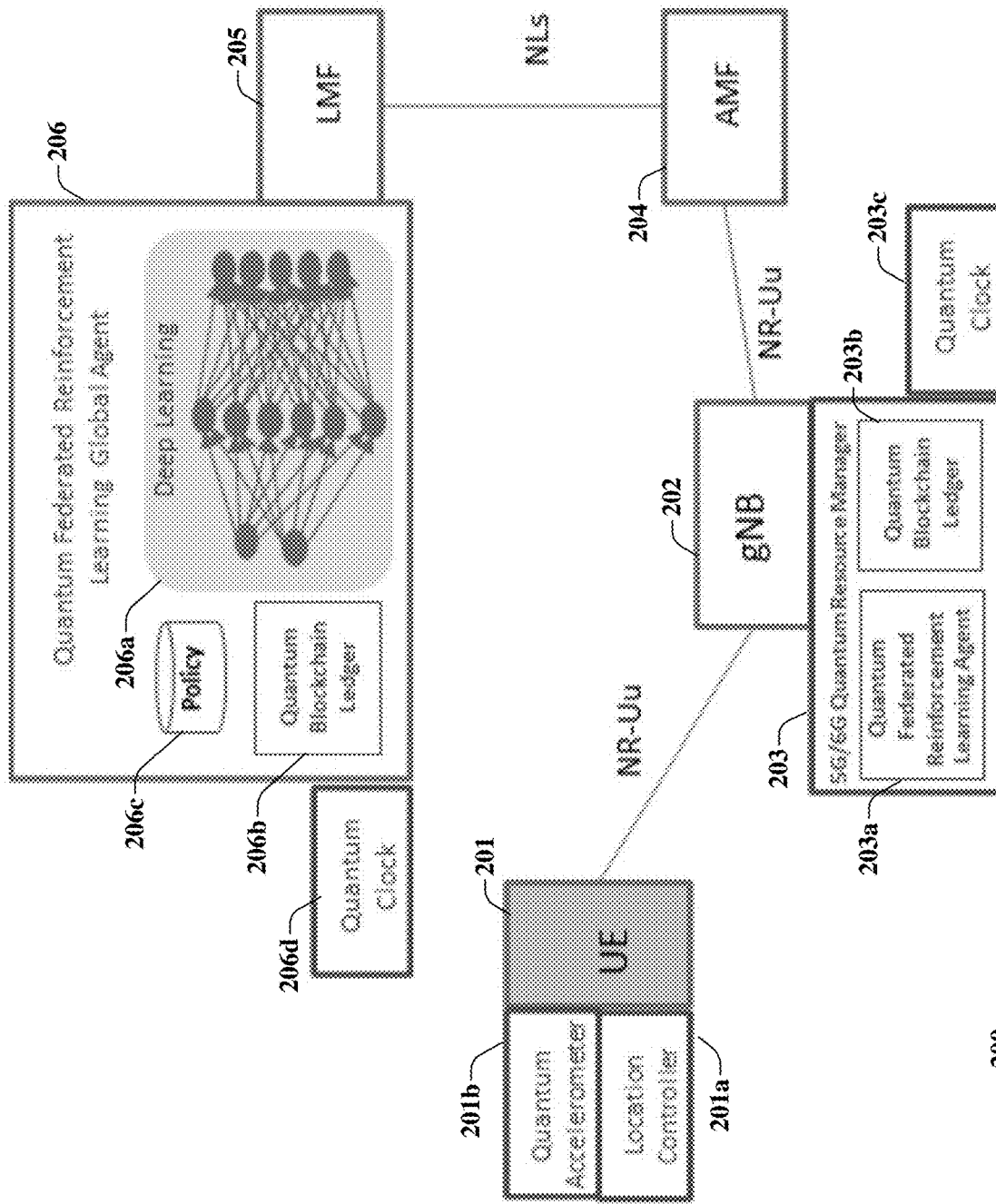
FIG. 2B is a block diagram illustrating an example, non-limiting embodiment of a quantum positioning system (QPS) with quantum artificial intelligence (QAI) and quantum machine learning (QML) functions operating within the communications network of FIG. 1 in accordance with various aspects described herein.

FIG. 2B is a block diagram illustrating an example, non-limiting embodiment of a quantum positioning system (QPS) with quantum artificial intelligence (QAI) and quantum machine learning (QML) functions operating within the communications network of FIG. 1 in accordance with various aspects described herein. As shown in FIG. 2B, system 200 comprises user equipment (UE 201), gNB 202 including a quantum resource manager (QRM 203), AMF 204, LMF 205 and a quantum federated reinforcement learning global agent (QFRL 206).

UE 201 comprises a location controller 201a that includes interfaces with sensors, such as quantum/classical accelerometers 201*b*. UE location controller 201*a* further interfaces with atomic clocks and IoT sensors (not illustrated). UE location controller 201*a* communicates with QRFL 206 over 5G 3GPP NR Positioning Protocol Annex (NRPPa) protocol via gNB 202, AMF 204 and LMF 205.

QRM 203 comprises a Quantum Federated Reinforcement Learning Agent (QFRLA 203*a*) and a quantum blockchain ledger (QBL 203*b*), and interfaces with a quantum clock 203*c*.

QFRLA 203*a* employs federated reinforcement learning (FRL) that enables construction of a common, robust machine learning (ML) model in the absence of data sharing, thus addressing critical issues such as data privacy, data security, data access rights, and access to heterogeneous data. FRL is a decentralized, collaborative approach to reinforcement learning (RL) that allows multiple entities to train data respectively and build a shared model while maintaining privacy, enabling UEs to collaboratively learn a shared model for location prediction while keeping training data on the UE, and decouples the need to communicate with a centralized LMF when location security and accuracy is threatened. Multiple, distributed agents train on local data, which is not distributed or shared, and build a shared, centrally orchestrated model while maintaining privacy. Federated Learning in this embodiment has these characteristics:

Distribution—two or more distributed agents jointly build a model to solve problem.
  Independent Data—each agent holds independent data and uses it for model training.
  Data protection—the data held by each agent is not sent to the other agent during model training. The agent learning is conveyed through model parameters that do not involve privacy.
  Secure communication—the model is transmitted between parties with the support of an encryption scheme. The original data cannot be inferred even if it is eavesdropped during transmission.
  Guaranteed performance. The performance of the resulting model is close to that of the ideal model established with all data transferred to one centralized party.

The federated RL model follows these steps. The process continues to repeat the steps from 2 to 5 until the model converges, or until the maximum number of iterations is reached.

Step 1: In the process of setting up a client-server-based learning system, the global coordinator creates an initial model and sends it to each distributed agent. Agents which are created or join later can access the latest global model.
  Step 2: Each agent trains a local model based on their own dataset.
  Step 3: Updates of model parameters are sent to the global controller
  Step 4: The global controller combines the model updates using aggregation algorithms.
  Step 5: The combined model is sent back to the distributed agents.

Reinforcement Learning (RL) is a branch of ML that focuses on how individual agents (controllers) interact with their environment and maximize a cumulative reward. Agents learn to improve their behavior through trial and error. Using a set of policies, the agents take actions to explore the environment and expect to be rewarded. Unlike other methods of ML, such as supervised learning and unsupervised learning, RL does not learn from the pre-provided samples, but generates samples to learn for a specific target.

FIG. 2C illustrates a basic model of reinforced learning. As shown in FIG. 2C, the basic model of RL contains several important concepts:

Environment and agent: Agents are a part of a RL model that exists in an external environment. Agents can improve their behavior by interacting with the environment. Specifically, agents take a series of actions to the environment through a set of policies and expect to get a high payoff or achieve a certain goal.
  Time step: The entire process of RL can be discretized into different time steps. At every time step, the environment and the agent interact accordingly.
  State: The state reflects agents' observations of the environment. When agents take action, the state will also change. In other words, the environment will move to the next state.
  Actions: Agents can assess the environment, make decisions, and finally take certain actions. These actions are imposed on the environment.
  Reward: After receiving the action of the agent, environment will give the agent the state of the current environment and the reward due to the previous action. Reward represents an assessment of the action taken by agents.

The results of the RL are action decisions, called policy. The policy gives agents the action (At) that should be taken for each state (St). Policy is noted as (AtjSt), which represents the probability of taking action At in state St. The goal of RL is to maximize the value function from the environment and optimize the policy. The goal is not to get the maximum reward after a single action in the short term, but to get more reward in the long term.

FIG. 2D illustrates categories of reinforced learning. In RL, there are several categories of algorithms. One algorithm is value-based (actor only) and the other is policy-based (critic only). In addition, there is also an actor-critic algorithm that can be obtained by combining the two, as shown in FIG. 2D. Value-based, actor-only methods typically work with a parameterized family of policies over which optimization procedures can be used directly. The benefit of a parameterized policy is that a spectrum of continuous actions can be generated, but the optimization methods used (typically called policy gradient methods) suffer from high variance in the estimates of the gradient, leading to slow learning.

Critic-only methods that use temporal difference learning have a lower variance in the estimates of expected returns. A straightforward way of deriving a policy in critic-only methods is by selecting greedy actions, i.e., actions for which the value function indicates that the expected return is the highest. However, to do this, one needs to resort to an optimization procedure in every state encountered to find the action leading to an optimal value. This can be computationally intensive, especially if the action space is continuous. Therefore, critic-only methods usually discretize the continuous action space, after which the optimization over the action space becomes a matter of enumeration. Obviously, this approach undermines the ability of using continuous actions and thus of finding the true optimum.

Actor-critic methods combine the advantages of actor-only and critic-only methods. While the parameterized actor brings the advantage of computing continuous actions without the need for optimization procedures on a value function, the critic's merit is that it supplies the actor with low-variance knowledge of the performance. More specifically, the critic's estimate of the expected return allows for the actor to update with gradients that have lower variance, speeding up the learning process. The lower variance is traded for a larger bias at the start of learning when the critic's estimates are far from accurate. Actor-critic methods usually have good convergence properties, in contrast to critic-only methods.

Like actor-only methods, actor-critic methods can produce continuous actions, while the large variance in the policy gradients of actor-only methods is countered by adding a critic. The role of the critic is to evaluate the current policy prescribed by the actor. In principle, this evaluation can be done by any policy evaluation method commonly used, such as Temporal Difference (TD), Least Squares Temporal Difference (LSTD) or residual gradients. The critic approximates and updates the value function using samples. The value function is then used to update the actor's policy parameters in the direction of performance improvement. These methods usually preserve the desirable convergence properties of policy gradient methods, in contrast to critic-only methods. In actor-critic methods, the policy is not directly inferred from the value function by using. Instead, the policy is updated in the policy gradient direction using only a small step size aa, meaning that a change in the value function will only result in a small change in the policy, leading to less or no oscillatory behavior in the policy.

FIG. 2E illustrates a schematic structure of reinforced learning in the actor-critic model. The learning agent has been split into two separate entities: the actor (policy) and the critic (value function). The actor is only responsible for generating a control input u, given the current state x. The critic is responsible for processing the rewards it receives, i.e., evaluating the quality of the current policy by adapting the value function estimate. After a number of policy evaluation steps by the critic, the actor is updated by using information from the critic.

Reinforcement learning algorithms are extremely sensitive to the choice of hyperparameters, typically requiring significant manual effort to identify and tune hyperparameters that perform well on a new domain. Self-tuning is a new area of study with significant recent progress in the state of the art for RL self-tuning including self-tuning and optimization of the differentiable hyperparameters in an actor-critic loss function. Meta-optimization and automated frameworks have also recently appeared. Further advances in Automated RL tuning and dispensing with required manual tuning of an RL algorithm's hyperparameters are assumed such that manual tuning will not be required for the RL Models in this idea.

Returning to FIG. 2B, QBL 203b implements smart contracts for UE proof of location and position tracking, thereby providing a transparent, systematic method for detection of ground truth position, anomaly detection, alerting and expulsion. This method includes visibility for the UE as well as the first responder authority both of which can quickly determine active user location, position, and trajectory. See, U.S. patent application Ser. No. 17/498,229, filed Oct. 11, 2021, entitled "System and Method for Managing Communication Networks with Quantum Blockchains," which is incorporated by reference herein. Two trusted third parties, for example a public safety agency and a third-party application provider can exchange services through the smart contract without requiring any actions by the carrier that is providing the network and QBL 203b. One example might be a service provided by a third party to a public safety agency based on location or area. If a public safety UE device is in a geo-fenced area or at a location, the third party could provide services unique to that area and for the specific public safety agency. A detailed map or AR/VR application to navigate a building or area might be one example of a unique service that could be provided. The smart contract can provide this service via software primitives and the Quantum Blockchain can store an auditable record of third-party transactions. Another example would be a fire or chemical spill at a location. The public safety agency may have equipment to take readings for example, on the spill or fire but not have the machine learning platform and data with which to analyze environmental factors (i.e., weather, wind, etc.) that could predict the area of impact of the spill or fire.

QFRL 206 comprises a deep learning neural network 206a, a QBL 206b, a policy datastore 206c and interfaces with a quantum clock 206d. QFRL 206 controls when QRM 203 sends federated ML model updates back to QFRL 206 based on mobile network traffic load to avoid network overload during network peak or overload conditions. Training a global model with a very large dataset is computationally and network resource intensive. Federated learning distributes the computation load to a set of distributed learning agents. Each local agent maintains a local version of the global model hyper-parameters. Location prediction is only done by the local agents using local data and the global model. Local agents send location prediction model hyper-parameters to the global agent. The global model runs a hyper-parameter tuning method. One example would be through the use of deep learning model weights that are collected from the local model and optimized by the global model. This method improves privacy because the location data is not shared with the global agent. Network efficiency is also improved as massive location data sets aren't sent to the global agent. With potentially billions of agents, this would quickly overload the network.

Figure 2F:
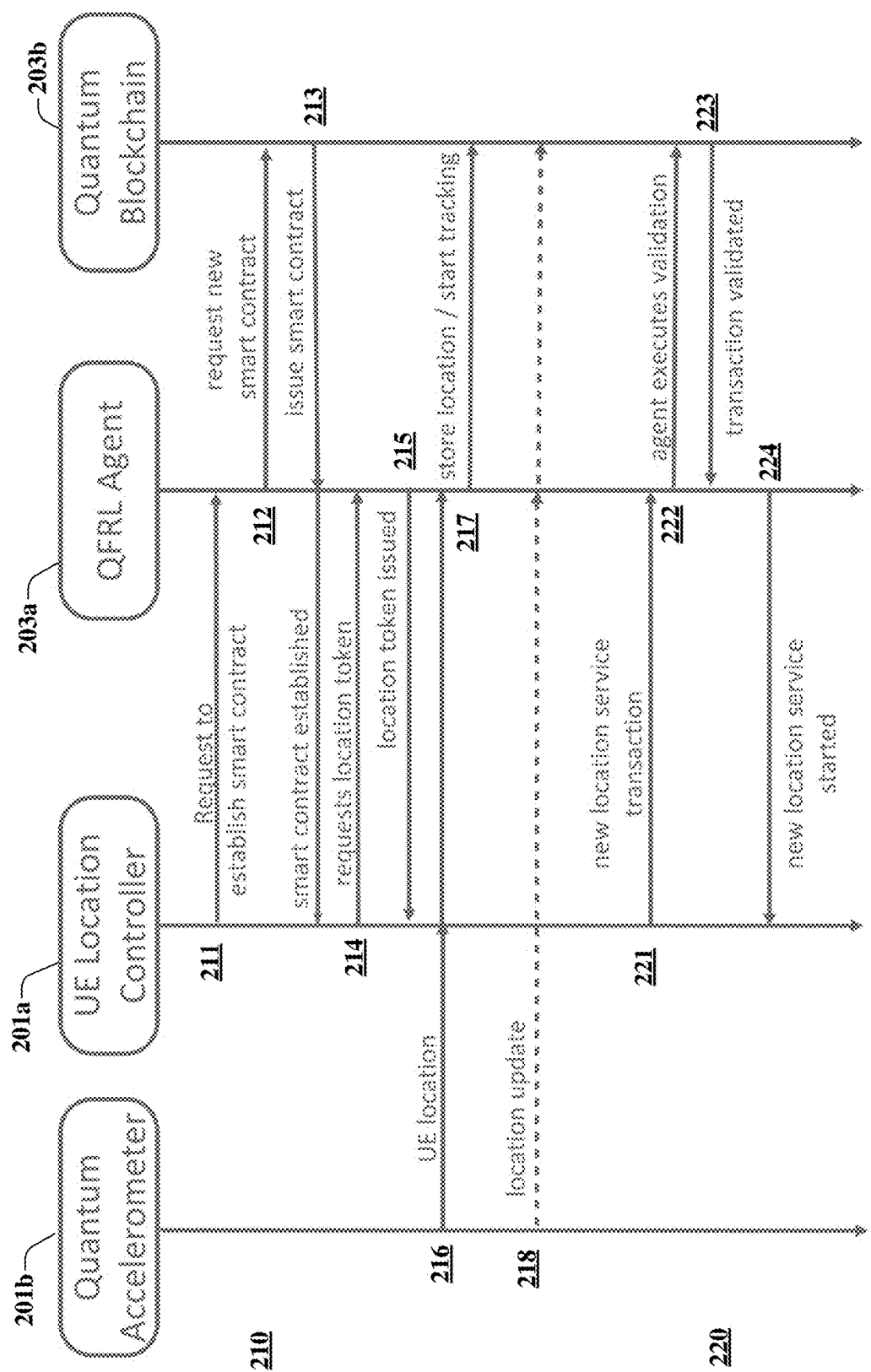
FIG. 2F depicts an illustrative embodiment of methods for location tracking and location services in accordance with various aspects described herein.

FIG. 2F depicts an illustrative embodiment of methods for location tracking and location services in accordance with various aspects described herein. As shown in FIG. 2C, a method for location tracking 210 begins at step 211 where UE location controller 201a sends a message via UE 201 (not illustrated) through network link NR-Uu via gNB 202 (not shown but see FIG. 2B) to QRFLA 203a to request establishing a smart contract. In step 212, QRFLA 203a requests a new smart contract from QBL 203b. In step 213, QBL 203b issues a smart contract to QRFLA 203a, which in turn passes the smart contract through the network (via gNB 202 and UE 201 over NR-Uu, not shown, see FIG. 2B) to UE location controller 201a.

Next, in step 214, UE location controller 201a requests a location token from QRFLA 203a to uniquely identify and label location information for UE 201. A location authentication process creates unique tokens for QRFLA 203a to provide updates and utilizes a local location token (provided by a node) and a trusted identity token (provided by QRFLA 203a) and provides a means by which to define and discover UE violations/anomalies (spoofing) and attack detection as part of the smart contract. Operators can determine policy violations/anomalies and transparently publish them such that first responder membership can be verified with the application owner and justly terminated for violating policy.

In step 215, QRFLA 203a issues a token and sends the token over the network to UE location controller 201a.

Next in step 216, quantum accelerometer 201b provides a position of UE 201 to UE location controller 201a. A reference time can be obtained from a clock (quantum and/or classical clock) either locally on UE 201 or via other methods (satellite, over the air interfaces, nearby UEs, etc.). Representative location data may also include environmental data, climate data, photo/video data, transportation data, human mobility data, social data, etc. UE location controller 201a forwards this location information to QRFLA 203a. The initial UE 201 reference position can be obtained by the following methods either individually or in combination:

Downlink time difference of arrival (DL-TDOA): A new reference signal known as the positioning reference signal (PRS) is introduced in Release 16 for the UE to perform downlink reference signal time difference (DL RSTD) measurements for PRSs received by each gNB 202. These measurements are reported to QRFLA 203a.

Uplink time difference of arrival (UL-TDOA): The Release-16 sounding reference signal (SRS) is enhanced to allow gNB 202 to measure the uplink relative time of arrival (UL-RTOA) and report the measurements to QRFLA 203a.

Downlink angle-of-departure (DL-AoD): UE 201 measures the downlink reference signal receives power (DL RSRP) per beam/gNB. Measurement reports are used to determine the AoD based on UE beam location for each gNB. QRFLA 203a uses the AoDs to estimate the position of UE 201.

Uplink angle-of-arrival (UL-AOA): gNB 202 measures the angle-of-arrival based on the beam UE 201 is located in. Measurement reports are sent to QRFLA 203a.

Multi-cell round trip time (RTT): gNB 202 and UE 201 perform Rx-Tx time difference measurement for the signal of each cell. The measurement reports from the UE 201 and gNB 202 are sent to QRFLA 203a to determine the round-trip time of each cell and derive the position of UE 201.

Enhanced cell ID (E-CID) is based on RRM measurements (e.g., DL RSRP) of each gNB at UE 201. The measurement reports are sent to QRFLA 203a.

UE-based Downlink reference signal reference power (DL RSRP) per beam/gNB

UE-based Downlink reference signal time difference (DL RSTD)

UE-based UE RX-TX time difference

GPS, Wi-Fi, QPS or quantum/classical satellite or other reference signals

Next in step 217, QFRLA 203a forwards the location of UE 201 for storage in QBL 203b. Finally, in step 218, quantum accelerometer 201b provides updated locations of UE 201 via UE location controller 201a and the network to QBL 203b.

Also as shown in FIG. 2C, a method for location services 220 begins at step 221 where a new location service transaction is initiated by UE location controller 201a and is sent via UE 201 through the network via gNB 202 to QFRLA 203a. In step 222, QFRLA 203a provides a validation request of the new location service with QBL 203b. In step 223, QBL 203b validates the new location service. Finally, in step 224, QRFLA 203a informs UE location controller 201a that a new location service has started.

In an embodiment, nearby devices that transmit location and timing information (delay) that can be used to determine position. This can be done with 3GPP ProSe Device-to-Device for Public Safety standard which defines direct UE-to-UE communications.

In an embodiment, the UE FRL agents determine motion sensing & positioning using different sensors, i.e., quantum and classical accelerometers, gyroscopes, magnetometers, etc. and calculate the displacement of the UE from a predetermined reference position. The UE estimates a relative displacement based upon a reference position and/or reference time. The UE sends a report to the LMF comprising the determined relative displacement which can be used to determine the absolute position.

Figure 2G:
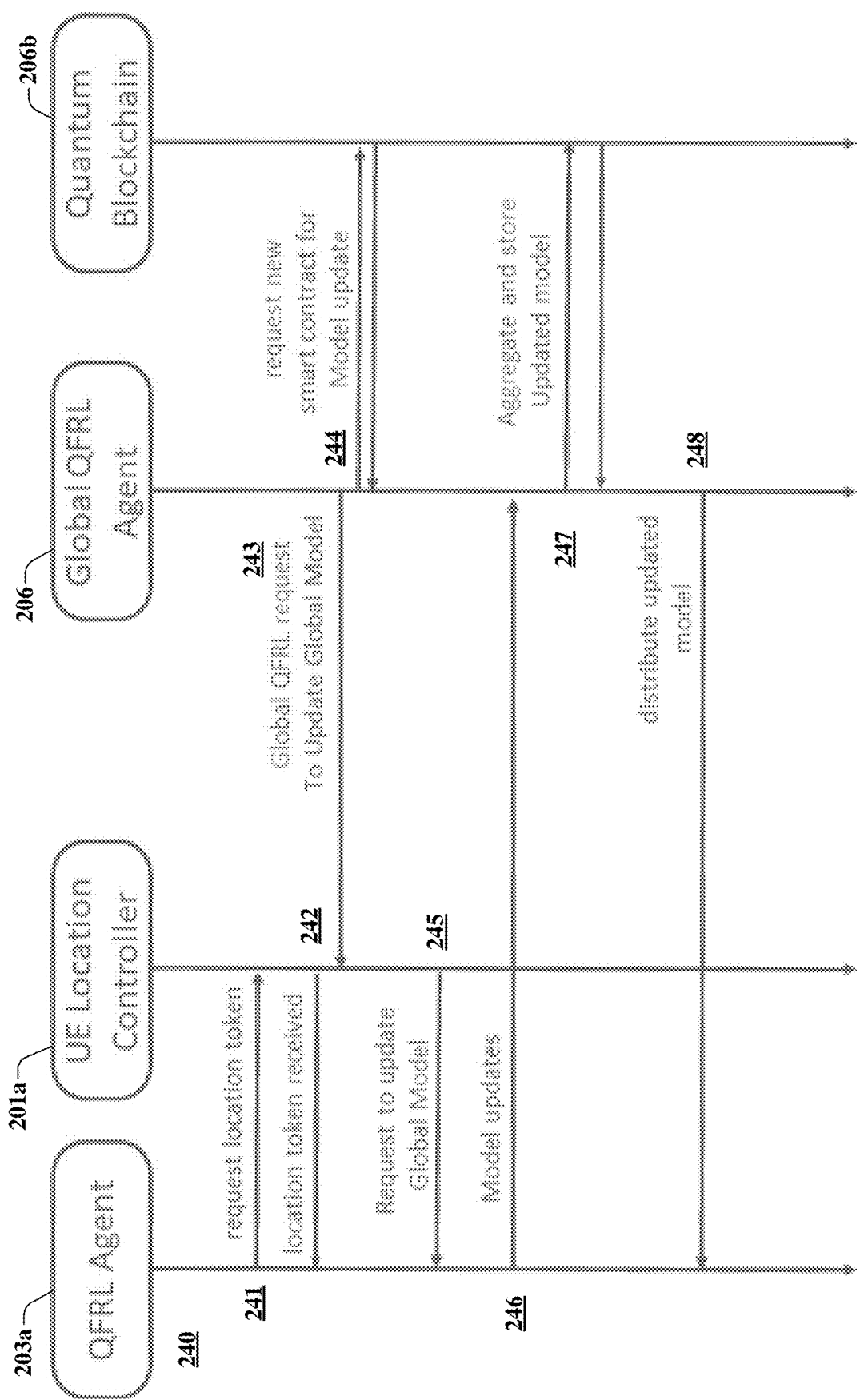
FIG. 2G depict an illustrative embodiment of a method for updating a model for position estimation in accordance with various aspects described herein.
Figure 2H:
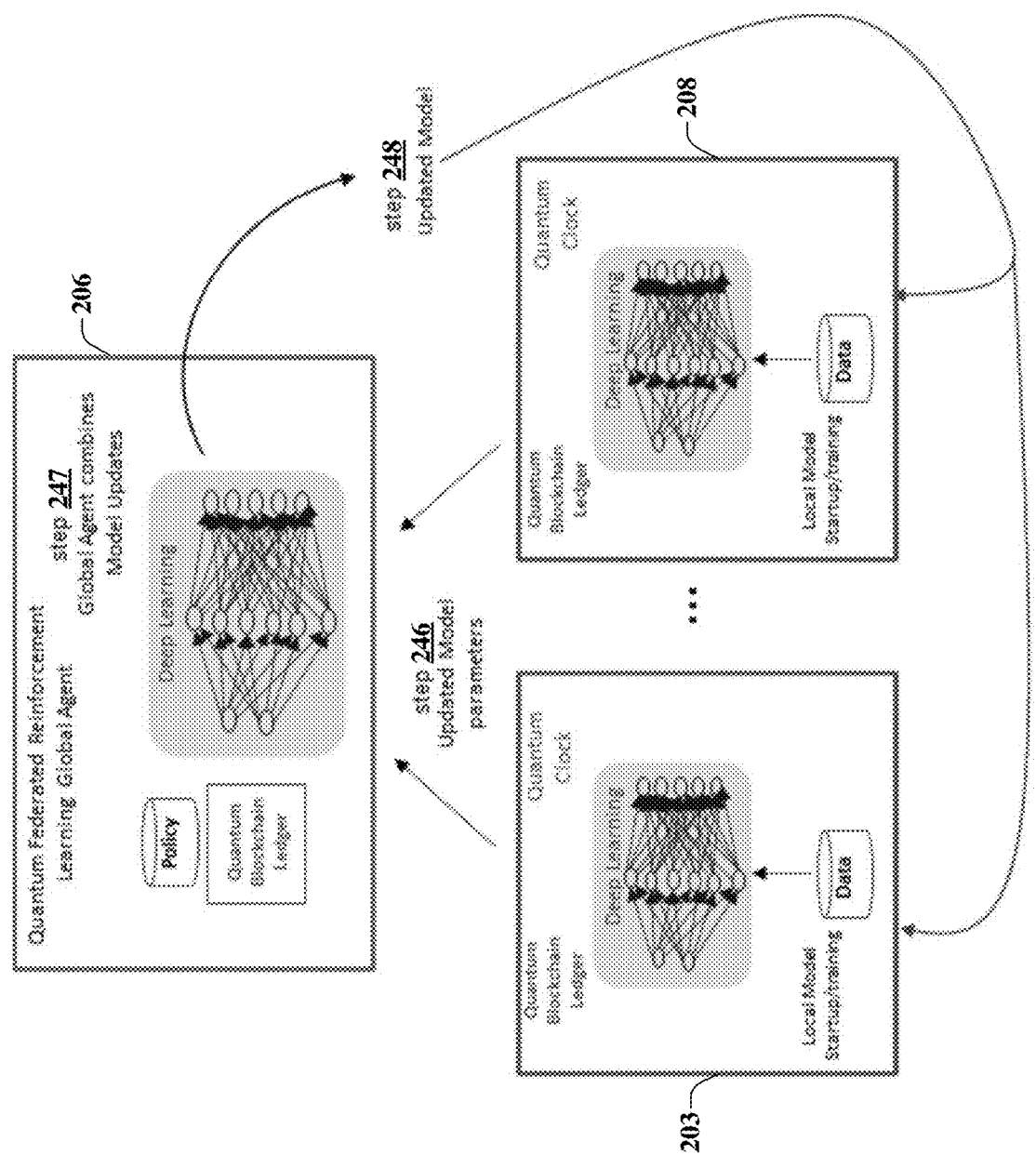
FIG. 2H illustrates a core network comprising federated reinforcement learning agents for updating a model for position estimation in accordance with various aspects described herein.

FIG. 2G depict an illustrative embodiment of a method for updating a model for position estimation in accordance with various aspects described herein. FIG. 2H illustrates a core network comprising federated reinforcement learning agents for updating a model for position estimation in accordance with various aspects described herein. The local agent model estimates position. The global agent updates the global model with local model hyper-parameters.

As shown in FIG. 2G, a method 240 for updating a model begins at step 241 where QFRLA 203a requests a location token from UE location controller 201a. Next in step 242, UE location controller 201a provides the location token for UE 201 to QFRLA 203a.

In step 243, QFRL 206 sends a request to update the global model to UE location controller 201a. In step 244, QFRL 206 requests and receives a new smart contract from QBL 206b. In step 245, UE location controller forwards the request of QFRL 206 to update the global model to QFRLA 203a.

Next in step 246, QFRLA 203a sends model updates to QFRL 206. This step is also illustrated in FIG. 2H. In step 247, QFRL 206 aggregates model updates received from various federated reinforced learning agent in the network, such as from agents associated with QRM 203 and QRM 208. Finally, in step 248, QFRL 206 updates the models in the local agents.

While for purposes of simplicity of explanation, the respective processes are shown and described as a series of blocks or arrows in FIGS. 2C, 2E, 2F, 2G and 2H, it is to be understood and appreciated that the claimed subject matter is not limited by the order of the blocks or arrows, as some blocks or arrows may occur in different orders and/or concurrently with other blocks or arrows from what is depicted and described herein. Moreover, not all illustrated blocks or arrows may be required to implement the methods described herein.

In an embodiment, a quantum graph neural network (GNN) modeler predicts network traffic based on graph-structured data (i.e., matrix or other data structure) that represents complex relationships between and among network topology, routing, traffic, delay. GNN predicts when network traffic and delays are minimized to optimize global model updates. The GNN can also forecast UE direction, volume, speed and other parameters such as road traffic flow, road traffic volume, congestion, and traffic accidents, etc. These are useful in emergencies for first responder routing and responses. QFRL agents may be distributed in the network and control subsets of UE location controllers based on traffic movement patterns or other parameters.

In an embodiment, the GNN can also forecast UE direction, volume, speed, and other parameters such as road traffic flow, road traffic volume, congestion, and traffic accidents, etc. These are useful in emergencies for first responder routing and responses.

Figure 2I:
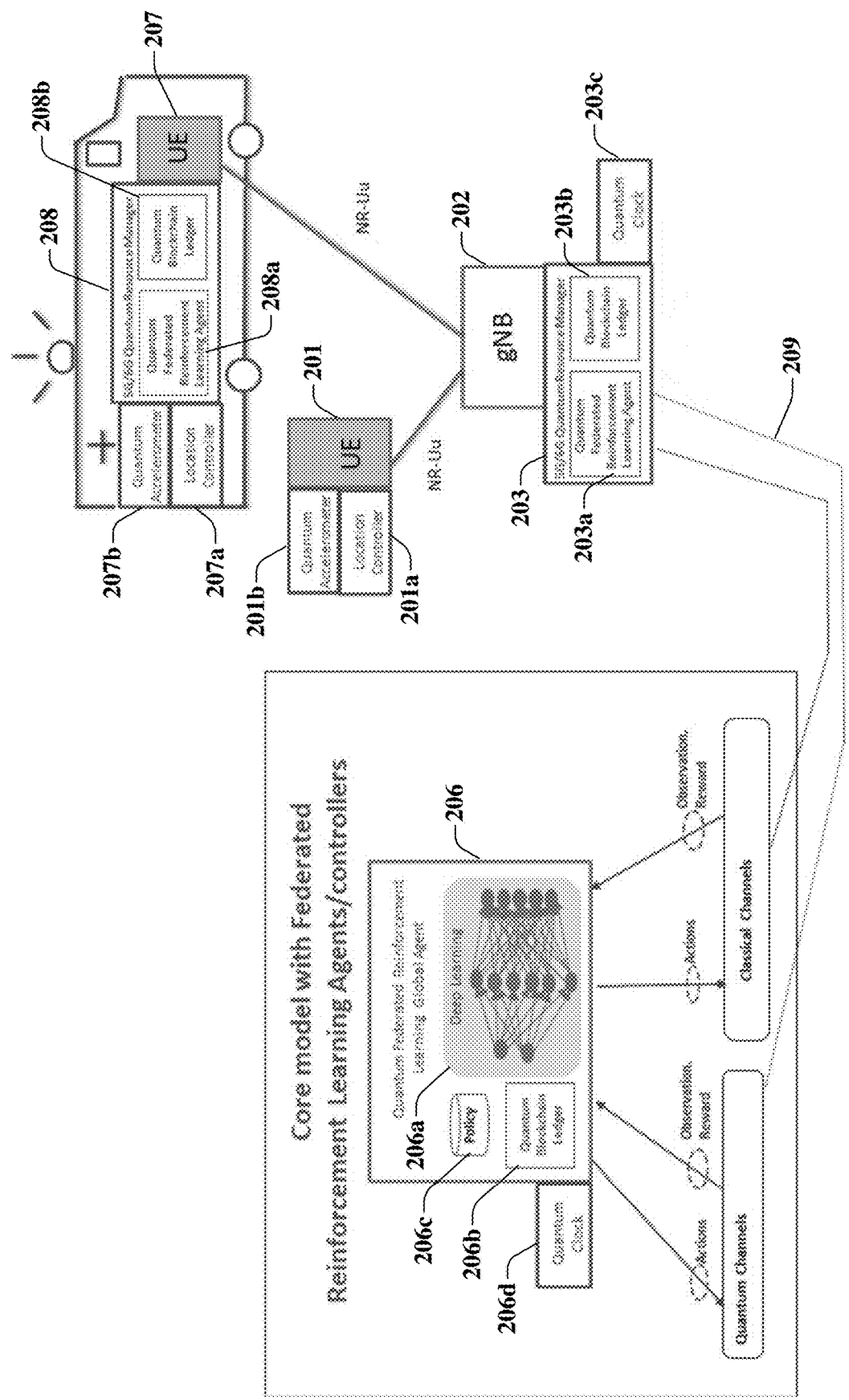
FIG. 2I is a block diagram illustrating an example, non-limiting embodiment of a quantum positioning system (QPS) with quantum artificial intelligence (QAI) and quantum machine learning (QML) functions operating within a quantum/classical hybrid communications network, including the communications network of FIG. 1, in accordance with various aspects described herein.

FIG. 2I is a block diagram illustrating an example, non-limiting embodiment of a quantum positioning system (QPS) with quantum artificial intelligence (QAI) and quantum machine learning (QML) functions operating within a quantum/classical hybrid communications network, including the communications network of FIG. 1, in accordance with various aspects described herein. FIG. 2I illustrates many of the same components as illustrated in FIG. 2B. However, FIG. 2I includes a UE 207 with a location controller 207*a* and a quantum accelerometer 207*b*, and mobile QRM 208 comprising a QFRLA 207*a* and QBL 207*b*.

Also illustrated in FIG. 2I are quantum channels 209 linking QFRL 206 with QRM 203, which provides the ability to share quantum data generated by quantum and hybrid quantum-classical computational runtime environments. Quantum data are characterized by quantum superposition and quantum entanglement, and yield n-dimensional probability distributions that require exponential compute resources to process, represent, store, and connect. The presence of quantum/hybrid quantum and classical end-to-end networked application resources in turn, exponentiates requirements to incorporate Quantum Positioning System (QPS), Quantum Artificial Intelligence (QAI), Quantum Machine Learning (QML), Quantum Deep Learning (QDL), Quantum Reinforcement Learning (QRL), and Quantum Blockchains within mobile and fixed communications networks.

Quantum computing and quantum networking have assumed strategic importance due to the following:

Continuing cost-performance improvements in classical (non-quantum) processor memory, speed, and very large-scale integration (VLSI) substrate density packing are not sustainable due to quantum effects that pervade the quantum scales at which electronic, photonic, opto-electric processors, devices, and network components are fabricated and process data; and Worldwide quantity of data volume (scale), variety (form, structured/unstructured), velocity (streaming) and veracity (uncertainty) is soaring due to exponential improvements in computing, storage, cloud, and mobility network economies of scale and specialization.

While the Internet and World Wide Web have changed how the world communicates, 'Big Data' has transformed how information itself is processed in the following ways:

Previous reliance upon collecting and using relatively small sample sizes has shifted to emphasis on collecting and storing vast quantities of information in cloud-based data lakes/repositories;

Highly curated data need to be provided against exponential increases in available information.

Quantum computation stores information as quantum bits (qubits) which are quantum generalizations of classical bits. Qubits can be represented as a two-to-n-level quantum system based on—for example—electronic/photonic spin and polarization, where:

The state of a qubit is a phase vector $|\psi\rangle$ (mathematical description of a quantum system, a complex-valued probability amplitude and the probabilities for possible results of measurements made on the system) in a linear superposition of states such as $|\psi\rangle = \alpha|0\rangle + \beta|1\rangle$;

State vectors $|0\rangle$ and $|1\rangle$ are physical eigenstates of the logical observable, and form a computational basis spanning a two-to-n dimensional Hilbert space (inner product space of two or more vectors, equal to the vector inner product between two or more matrix representations of those vectors) containing $|\psi\rangle$; and where a collection of qubits comprises a multi-particle quantum system.

Quantum computation can pursue all computational trajectories simultaneously based on quantum superposition, whereas classical computation proceeds in serial fashion. Quantum logic gates form basic quantum circuits that operate on qubits, are reversible with a few exceptions (unlike classical logic gates), and are unitary operators, described as unitary matrices relative to basis states.

Quantum computational speedup relative to classical (non-quantum) computing/networking derives in part from invocation of quantum processing algorithms, for example, Grover's quantum factoring, Shor's quantum search, or Routt's quantum search/quantum cryptosystem algorithms. Quantum algorithms utilize quantum circuit gates to manipulate states of quantum systems just as classical algorithms utilize classical logical gates (represented as a sequence of Boolean gates) to perform classical (non-quantum) computational operations.

Emerging quantum networks in turn, are based on quantum communication channels that transmit qubits between physically distinct quantum or hybrid quantum-classical processors able to perform quantum logic operations on qubits.

In an embodiment, QFRL agents may be distributed in the network illustrated in FIG. 2I. Such QFRL agents may control subsets of UE location controllers based on traffic movement patterns or other parameters.

In an embodiment, Quantum Positioning System (QPS)-based location and situational awareness are enabled via quantum entanglement-based estimation of relative time and frequency between general and target probes utilizing quantum clocks, quantum gyroscopes, and quantum accelerometers to generate relative position and velocity. Given a device starting point, device positioning would be calculated over time using a quantum clock and quantum accelerometer where quantum clock synchronization is derived from the quantum entanglement of pairs of quantum network nodes incorporating synchronized quantum clocks. Network nodes would include those illustrated in FIG. 2I including core nodes, base stations, vehicles, hand/body worn devices, etc. that could be equipped with chip-level quantum clocks.

Figure 2J:
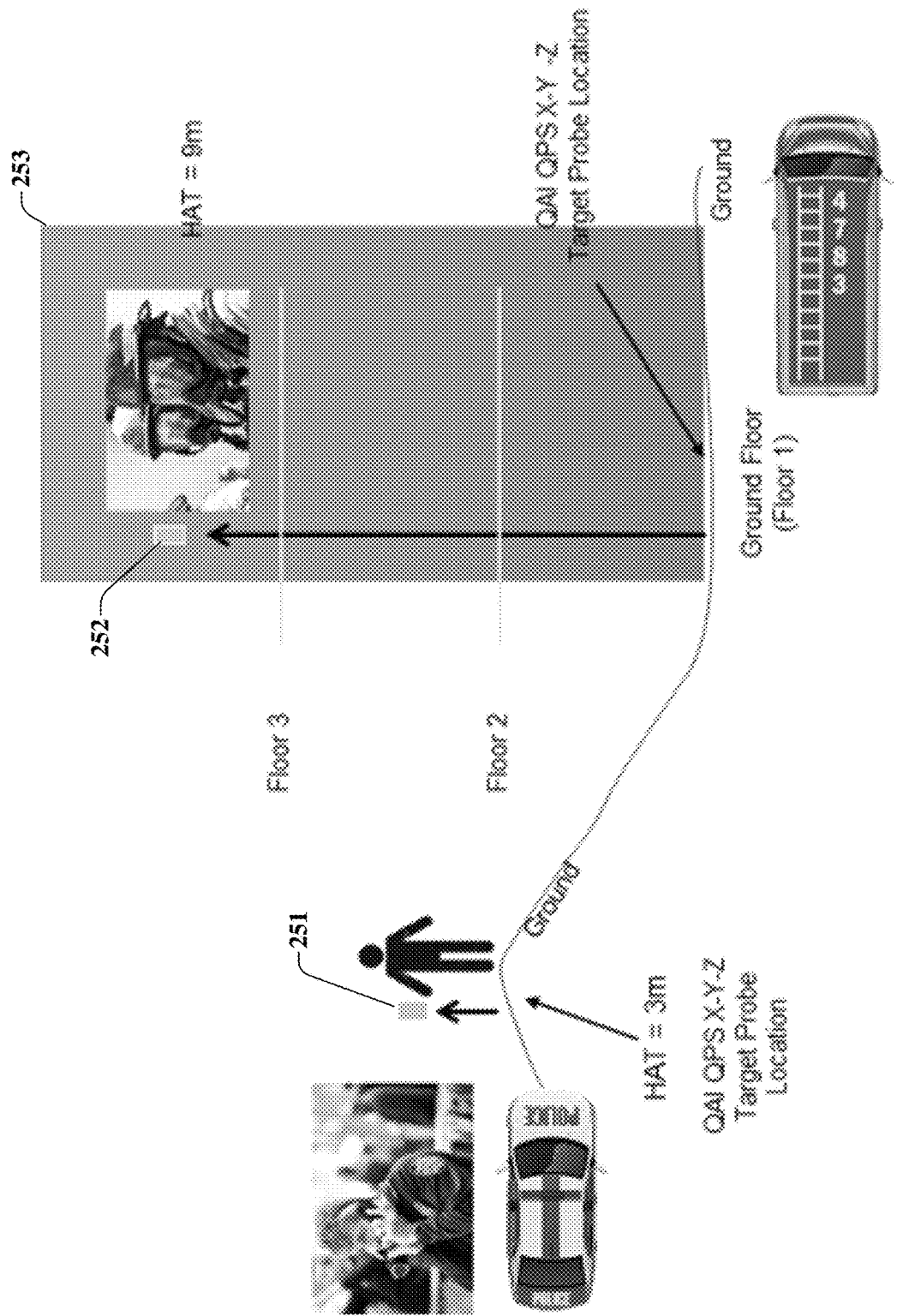
FIG. 2J is a block diagram illustrating an example, non-limiting embodiment of use cases of a quantum positioning system (QPS) with quantum artificial intelligence (QAI) and quantum machine learning (QML) functions operating within a quantum/classical hybrid communications network, including the communications network of FIG. 1.

FIG. 2J is a block diagram illustrating an example, non-limiting embodiment of use cases 250 of a quantum positioning system (QPS) with quantum artificial intelligence (QAI) and quantum machine learning (QML) functions operating within a quantum/classical hybrid communications network, including the communications network of FIG. 1. As shown in FIG. 2J, UE 251 and UE 252 are in separate locations near a structure 253. UE 251 is located outside on a hill 3m above the ground floor of structure 253, whereas UE 252 is located inside the structure 253, on the third level about 9m above the ground floor of the structure. Three dimensional (3D) QAI-based QPS location and situational awareness are enabled via integration of X-Y (2D) and Z (Altitude) axes utilizing quantum accelerometers, gyroscopes and interferometers (represented adjacent to UE 251 and UE 252 first responders, as illustrated in FIG. 2J) to facilitate indoor and outdoor navigation and wayfinding via quantum entanglement-based estimation of location and barometric pressure at the target location, yielding relative floor level (indoors) and height above terrain (HAT, indoors/outdoors).

In an embodiment, QAI-based QPS integrate pitch, yaw, and rotation into the three dimensions of spatial location/movement to enable location of moving and stationary objects within a Space-Air-Ground-Integrated-Networking (SAGIN) environment.

In an embodiment, QAI-based QPS enable connections and communications between source and target probes via one or a plurality of low earth orbit (LEO) satellites, dramatically reducing communications latency and increasing throughput and round-trip time (RTT) relative to that of geosynchronous (GEO) satellites, enabling low-latency integrated Land, Air, Space, Sea 3D position/velocity situational awareness.

Whereas classical (non-quantum) Radar/Lidar electromagnetic pulses interrogate regions of interest, back-reflected signals are collected, and target longitudinal position is ascertained via measurement of round-trip time-of-flight, and where target radial velocity can be inferred via Doppler frequency shift of returned signals, in an embodiment, QPS would establish quantum coherence and entanglement relationships between and among a plurality of source and target IoT sensors and/or associated servers to provide quantum metrology and quantum imaging, yielding precision measurements and image resolution not achievable via classical physics and not dependent on GPS satellite systems; single- or multi-photon-pair pulses would interrogate regions in space that contain one or a plurality of candidate targets; two-way classical communication channels are established between source and target probes or probe servers; source/target system clocking is synchronized on a short-term basis based on quantum entanglement therein effectively eliminating classical GPS time of arrival (TOA) reference clocking; photons are prepared in a central wave frequency where target range and velocity can be estimated as a function of back-reflected single-/multi-photon-pair back-reflection time delays and deviations from origin wave frequency; and QPS quantum TOA (QTOA) is integrated with target probe x, y, z HAT plus pitch, yaw, rotation coordinates.

In an embodiment, QAI-based QPS integrates inertial sensors and n-axis accelerometers utilizing atomic interferometry. In another embodiment, QAI-based QPS provides public safety incident management situational awareness via mapping of target areas of interest, location tracking/status of first responder and non-first responder personnel, alerts, relevant photos and videos, sensory data and texts via portal-accessible dashboards.

In an embodiment, QAI-based QPS enables multi-agency geofencing and dynamic grouping based on recognition of geofence areas, dynamic creation of "incident groups", auto-identification of first responders and attached devices/probes within geofenced areas, to facilitate communication and tracking across a plurality of platforms (i.e., Push-to-Talk (PTT), Mission Critical (MC) PTT, MC Data, MC Video, Messaging, Location) to generate/associate tag data with incident identifier generating multi-dimensional views and supporting post-incident reporting.

In an embodiment, QAI-based QPS integrates with one or a plurality of mapping applications. In another embodiment, QAI-based QPS enables a network of distributed quantum blockchains, QRMs, and QRL agents in conjunction with a plurality of policy and deep learning components would manage sensing data for sensors including ownership, sharing rights, and smart contracts.

QAI-based QPS generates user correlated (UC) data yielding real-time current/active catalogs of decision-making data points accessible to public safety entities (PSEs) and public safety agencies (PSAs) through incorporation of QAI, QML, QRL, and quantum blockchain operations A network of distributed QRMs, quantum blockchains and QRL agents with policy and deep learning components would manage resource records and enable resource sharing between and among resource owners (public safety agencies, network operators and other resource owners) enabling location and tracking of public safety assets (personnel, vehicles, equipment, etc.), integrating data, video, voice, graphical, images, in-building solutions, location-centric on-demand capacity, Mission Critical-Push To Talk (MC-PTT) resources, MC-Data, MC-Video resources, geofencing data, remotely controlled autonomous assets such as connected vehicles, drones, robots, etc. within an emergency services architecture.

In an embodiment, QAI-based QPS enables a network of distributed QRMs with QBLs, and QRL agents providing multi-party, policy- and deep learning-based public safety smart contracts for resource sharing, resource rights transfer, security, transaction processing, payment between trusted parties, providing consistency and resource integrity. The QAI-based QPS enables a network of distributed QRMs with QBLs, and QRL agents with policy and deep learning components provide multi-party, policy- and deep learning-based public safety and other resource owners with an audit trail of verifiable transaction data and digital signatures for a plurality of sensing resource data. The QAI-based QPS enables a network of distributed QRMs with QBLs, and QRL agents with policy and deep learning components provide multi-party public safety and other resource owners with a database of all Virtual Reality/Augmented Reality/Mixed Reality (VR/AR/MR), holographic communications tracking, to include the three dimensions of spatial movement along x-y-z axes, plus pitch, yaw. Such tracking would also include time, speech, eye, body position/posture, facial expression, biometrics, touch, smell, taste, and audio.

In an embodiment, QAI-based QPS enables a network of distributed QRMs with QBLs, and QRL agents with policy and deep learning components provide secure real-time status and tracking of public safety personnel health key performance indicators (KPIs) and alerts when personnel health exceeds tracking and target threshold values.

In an embodiment, digital twins/metaverses—AI/ML virtual replicas of physical spaces/worlds/systems—share QAI-based QPS network resource data to simulate a target space/world/system more realistically. In the context of public safety, digital twins/metaverses enable solutions to otherwise intractable problems in a quantum digital world that are difficult to solve in the real-world in polynomial time.

In an embodiment, QAI-based QPS provide highly accurate network coverage maps based on tracking and resource location data. Network coverage holes would be identified and targeted for coverage with network assets (drones, public safety deployables, etc.) in emergency response scenarios. Population density and location data for coverage estimation would also be provided.

In another embodiment, QAI-based QPS detect and map location of landforms (water, wetlands, mountains, agriculture, forest, buildings, roads, tunnels, etc.) and enhance Geo-fencing and coverage analysis.

In an embodiment, QAI-based QPS enables a network of distributed QRMs with QBLs, and QRL agents generate deep learning Convolutional Neural Networks and other deep learning methods to detect, analyze, geo-tag location (latitude/longitude coordinates) and classify 3D objects for public safety applications.

In another embodiment, QAI-based QPS enables a network of distributed QRMs with QBLs, and QRL agents enable deep learning GNNs and other deep learning methods to interrogate quantum, classical, and hybrid quantum-classical data repositories to enable predictive and prescriptive optimization of ETE public safety networked application resources (i.e., end-to-end latency, throughput, Quality of Service (QoS), Priority, Preemption (QPP), target application resource availability).

In another embodiment, quantum radar from UAVs would acquire high resolution images from geographic areas including disaster areas that are not immediately accessible by humans, communicate images of damage and undamaged areas to a network of QAI-based QPS enables a network of distributed QRMs with QBLs, and QRL agents, where QRMs detect, identify, analyze and combine 3D objects for geo-fencing, map displays, AR/VR, and digital twins/metaverses.

In another embodiment, a continuous variable QPS model with an infinite-dimensional bosonic mode utilizes continuous quantum operators to calculate position and momentum. A QRL agent with policy-based, actor-critic, value-based or a combination of methods and quantum optical neural networks for deep learning would continuously control a QPS system.

In an embodiment, QAI-based QPS geo-spatial, temporal, high-resolution geographical image data and other sensor data are combined into a 3D quantum GNN-based QPS to aid public safety land, sea and air traffic forecasting and navigation.

In an embodiment, manned and Unmanned Aerial Vehicles (UAVs)—i.e., drones, would acquire high resolution images from disaster areas that are not immediately accessible by humans. The object detection, definition and location (latitude, longitude and elevation coordinates) of damaged and undamaged infrastructure would be stored in a blockchain ledger and included in any image analysis output along with geo-tagged location coordinates, degree of damage, best route to access, which side of a street, how far from a curb or other parameters. Undamaged and damaged infrastructure location and imaging would be added to real-time maps to display the status of damage assessments.

In an embodiment, instances where connectivity to the LMF is compromised the UE can locally determine absolute position by calculating the new position as an offset from the relative position. UE trajectory is a chronologically ordered sequence of states described by a vector of state variables (position, timestamps, etc.). A predicted trajectory is a function of the current location of the UE and the future locations. It is assumed the UE needs to visit a set of future locations sequentially. A UE agent can make decisions to visit future locations whereby there is a reward function for each location. The UE agent needs to weigh the cost in time, distance, and other variables to predict an optimal plan. Coincidently, a trajectory in RL, is a sequence of what has happened (in terms of state, action, reward) of a set of contiguous timestamps from a single part of a continuous problem. As an example, given {State, Action, and Reward} at time the agent transitions to {State, Action, and Reward} at time. Additional RL model inputs may include Initial reference position (latitude, longitude, altitude, pitch, yaw, rotation), reference location, direction, accelerometer (speed), target location and weights. Actor-Critic RL model algorithms are known in the art, including several variants, with source code widely available on Github and other sources. Examples of trajectory prediction include emergency vehicle routing in a wide area disaster. UAV (drones, tethered drones, etc.) positioning to improve network performance, surveillance, surveying, and damage assessment in a wide disaster area, etc.

Referring now to FIG. 3, a block diagram 300 is shown illustrating an example, non-limiting embodiment of a virtualized communication network in accordance with various aspects described herein. In particular a virtualized communication network is presented that can be used to implement some or all of the subsystems and functions of system 100, the subsystems and functions of system 200, and method 230 presented in FIGS. 1, 2A, 2B, 2C, and 3. For example, virtualized communication network 300 can facilitate in whole or in part requesting smart contracts for tracking a position of a mobile device from a quantum blockchain; issuing tokens for uniquely identifying location data for the position of mobile devices; receiving location data including the token from the mobile device, determining position a mobile device by displacement from an initial position using a quantum accelerometer; verifying location data; and storing location data in a quantum blockchain. In particular, a cloud networking architecture is shown that leverages cloud technologies and supports rapid innovation and scalability via a transport layer 350, a virtualized network function cloud 325 and/or one or more cloud computing environments 375. In various embodiments, this cloud networking architecture is an open architecture that leverages application programming interfaces (APIs); reduces complexity from services and operations; supports more nimble business models; and rapidly and seamlessly scales to meet evolving customer requirements including traffic growth, diversity of traffic types, and diversity of performance and reliability expectations.

In contrast to traditional network elements—which are typically integrated to perform a single function, the virtualized communication network employs virtual network elements (VNEs) 330, 332, 334, etc. that perform some or all of the functions of network elements 150, 152, 154, 156, etc. For example, the network architecture can provide a substrate of networking capability, often called Network Function Virtualization Infrastructure (NFVI) or simply infrastructure that is capable of being directed with software and Software Defined Networking (SDN) protocols to perform a broad variety of network functions and services. This infrastructure can include several types of substrates. The most typical type of substrate being servers that support Network Function Virtualization (NFV), followed by packet forwarding capabilities based on generic computing resources, with specialized network technologies brought to bear when general-purpose processors or general-purpose integrated circuit devices offered by merchants (referred to herein as merchant silicon) are not appropriate. In this case, communication services can be implemented as cloud-centric workloads.

As an example, a traditional network element 150 (shown in FIG. 1), such as an edge router can be implemented via a VNE 330 composed of NFV software modules, merchant silicon, and associated controllers. The software can be written so that increasing workload consumes incremental resources from a common resource pool, and moreover so that it is elastic: so, the resources are only consumed when needed. In a similar fashion, other network elements such as other routers, switches, edge caches, and middle-boxes are instantiated from the common resource pool. Such sharing of infrastructure across a broad set of uses makes planning and growing infrastructure easier to manage.

In an embodiment, the transport layer 350 includes fiber, cable, wired and/or wireless transport elements, network elements and interfaces to provide broadband access 110, wireless access 120, voice access 130, media access 140 and/or access to content sources 175 for distribution of content to any or all of the access technologies. In particular, in some cases a network element needs to be positioned at a specific place, and this allows for less sharing of common infrastructure. Other times, the network elements have specific physical layer adapters that cannot be abstracted or virtualized and might require special DSP code and analog front ends (AFEs) that do not lend themselves to implementation as VNEs 330, 332 or 334. These network elements can be included in transport layer 350.

The virtualized network function cloud 325 interfaces with the transport layer 350 to provide the VNEs 330, 332, 334, etc. to provide specific NFVs. In particular, the virtualized network function cloud 325 leverages cloud operations, applications, and architectures to support networking workloads. The virtualized network elements 330, 332 and 334 can employ network function software that provides either a one-for-one mapping of traditional network element function or alternately some combination of network functions designed for cloud computing. For example, VNEs 330, 332 and 334 can include route reflectors, domain name system (DNS) servers, and dynamic host configuration protocol (DHCP) servers, system architecture evolution (SAE) and/or mobility management entity (MME) gateways, broadband network gateways, IP edge routers for IP-VPN, Ethernet and other services, load balancers, distributers and other network elements. Because these elements do not typically need to forward substantial amounts of traffic, their workload can be distributed across a number of servers—each of which adds a portion of the capability, and which creates an overall elastic function with higher availability than its former monolithic version. These virtual network elements 330, 332, 334, etc. can be instantiated and managed using an orchestration approach similar to those used in cloud compute services.

The cloud computing environments 375 can interface with the virtualized network function cloud 325 via APIs that expose functional capabilities of the VNEs 330, 332, 334, etc. to provide the flexible and expanded capabilities to the virtualized network function cloud 325. In particular, network workloads may have applications distributed across the virtualized network function cloud 325 and cloud computing environment 375 and in the commercial cloud or might simply orchestrate workloads supported entirely in NFV infrastructure from these third-party locations.

Figure 4:
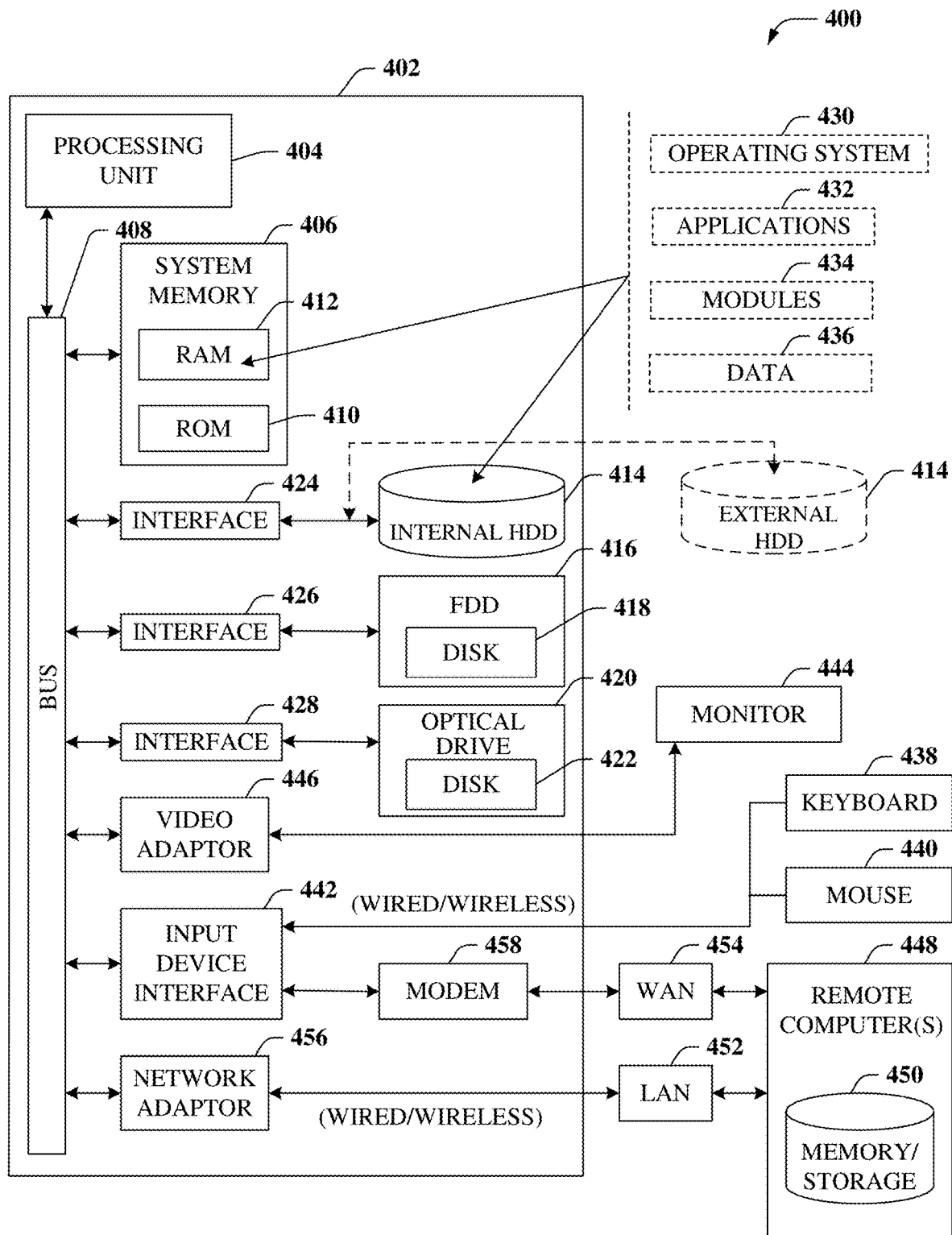
FIG. 4 is a block diagram of an example, non-limiting embodiment of a computing environment in accordance with various aspects described herein.

Turning now to FIG. 4, there is illustrated a block diagram of a computing environment in accordance with various aspects described herein. In order to provide additional context for various embodiments of the embodiments described herein, FIG. 4 and the following discussion are intended to provide a brief, general description of a suitable computing environment 400 in which the various embodiments of the subject disclosure can be implemented. In particular, computing environment 400 can be used in the implementation of network elements 150, 152, 154, 156, access terminal 112, base station or access point 122, switching device 132, media terminal 142, and/or VNEs 330, 332, 334, etc. Each of these devices can be implemented via computer-executable instructions that can run on one or more computers, and/or in combination with other program modules and/or as a combination of hardware and software. For example, computing environment 400 can facilitate in whole or in part requesting smart contracts for tracking a position of a mobile device from a quantum blockchain; issuing tokens for uniquely identifying location data for the position of mobile devices; receiving location data including the token from the mobile device, determining position a mobile device by displacement from an initial position using a quantum accelerometer; verifying location data; and storing location data in a quantum blockchain.

Program modules comprise routines, programs, components, data structures, etc., that perform particular tasks or implement particular abstract data types. Moreover, those skilled in the art will appreciate that the methods can be practiced with other computer system configurations, comprising single-processor or multiprocessor computer systems, minicomputers, mainframe computers, as well as personal computers, hand-held computing devices, microprocessor-based or programmable consumer electronics, and the like, each of which can be operatively coupled to one or more associated devices.

As used herein, a processing circuit includes one or more processors as well as other application specific circuits such as an application specific integrated circuit, digital logic circuit, state machine, programmable gate array or other circuit that processes input signals or data and that produces output signals or data in response thereto. It should be noted that while any functions and features described herein in association with the operation of a processor could likewise be performed by a processing circuit.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically comprise a variety of media, which can comprise computer-readable storage media and/or communications media, which two terms are used herein differently from one another as follows. Computer-readable storage media can be any available storage media that can be accessed by the computer and comprises both volatile and nonvolatile media, removable and non-removable media. By way of example, and not limitation, computer-readable storage media can be implemented in connection with any method or technology for storage of information such as computer-readable instructions, program modules, structured data or unstructured data.

Computer-readable storage media can comprise, but are not limited to, random access memory (RAM), read only memory (ROM), electrically erasable programmable read only memory (EEPROM), flash memory or other memory technology, compact disk read only memory (CD-ROM), digital versatile disk (DVD) or other optical disk storage, magnetic cassettes, magnetic tape, magnetic disk storage or other magnetic storage devices or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and comprises any information delivery or transport media. The term "modulated data signal" or signals refers to a signal that has one or more of its characteristics set or changed in such a manner as to encode information in one or more signals. By way of example, and not limitation, communication media comprise wired media, such as a wired network or direct-wired connection, and wireless media such as acoustic, RF, infrared and other wireless media.

With reference again to FIG. 4, the example environment can comprise a computer 402, the computer 402 comprising a processing unit 404, a system memory 406 and a system bus 408. The system bus 408 couples system components including, but not limited to, the system memory 406 to the processing unit 404. The processing unit 404 can be any of various commercially available processors. Dual microprocessors and other multiprocessor architectures can also be employed as the processing unit 404.

The system bus 408 can be any of several types of bus structure that can further interconnect to a memory bus (with or without a memory controller), a peripheral bus, and a local bus using any of a variety of commercially available bus architectures. The system memory 406 comprises ROM 410 and RAM 412. A basic input/output system (BIOS) can be stored in a non-volatile memory such as ROM, erasable programmable read only memory (EPROM), EEPROM, which BIOS contains the basic routines that help to transfer information between elements within the computer 402, such as during startup. The RAM 412 can also comprise a high-speed RAM such as static RAM for caching data.

The computer 402 further comprises an internal hard disk drive (HDD) 414 (e.g., EIDE, SATA), which internal HDD 414 can also be configured for external use in a suitable chassis (not shown), a magnetic floppy disk drive (FDD) 416, (e.g., to read from or write to a removable diskette 418) and an optical disk drive 420, (e.g., reading a CD-ROM disk 422 or, to read from or write to other high capacity optical media such as the DVD). The HDD 414, magnetic FDD 416 and optical disk drive 420 can be connected to the system bus 408 by a hard disk drive interface 424, a magnetic disk drive interface 426 and an optical drive interface 428, respectively. The hard disk drive interface 424 for external drive implementations comprises at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable storage media provide nonvolatile storage of data, data structures, computer-executable instructions, and so forth. For the computer 402, the drives and storage media accommodate the storage of any data in a suitable digital format. Although the description of computer-readable storage media above refers to a hard disk drive (HDD), a removable magnetic diskette, and a removable optical media such as a CD or DVD, it should be appreciated by those skilled in the art that other types of storage media which are readable by a computer, such as zip drives, magnetic cassettes, flash memory cards, cartridges, and the like, can also be used in the example operating environment, and further, that any such storage media can contain computer-executable instructions for performing the methods described herein.

A number of program modules can be stored in the drives and RAM 412, comprising an operating system 430, one or more application programs 432, other program modules 434 and program data 436. All or portions of the operating system, applications, modules, and/or data can also be cached in the RAM 412. The systems and methods described herein can be implemented utilizing various commercially available operating systems or combinations of operating systems.

A user can enter commands and information into the computer 402 through one or more wired/wireless input devices, e.g., a keyboard 438 and a pointing device, such as a mouse 440. Other input devices (not shown) can comprise a microphone, an infrared (IR) remote control, a joystick, a game pad, a stylus pen, touch screen or the like. These and other input devices are often connected to the processing unit 404 through an input device interface 442 that can be coupled to the system bus 408, but can be connected by other interfaces, such as a parallel port, an IEEE 1394 serial port, a game port, a universal serial bus (USB) port, an IR interface, etc.

A monitor 444 or other type of display device can be also connected to the system bus 408 via an interface, such as a video adapter 446. It will also be appreciated that in alternative embodiments, a monitor 444 can also be any display device (e.g., another computer having a display, a smart phone, a tablet computer, etc.) for receiving display information associated with computer 402 via any communication means, including via the Internet and cloud-based networks. In addition to the monitor 444, a computer typically comprises other peripheral output devices (not shown), such as speakers, printers, etc.

The computer 402 can operate in a networked environment using logical connections via wired and/or wireless communications to one or more remote computers, such as a remote computer(s) 448. The remote computer(s) 448 can be a workstation, a server computer, a router, a personal computer, portable computer, microprocessor-based entertainment appliance, a peer device or other common network node, and typically comprises many or all of the elements described relative to the computer 402, although, for purposes of brevity, only a remote memory/storage device 450 is illustrated. The logical connections depicted comprise wired/wireless connectivity to a local area network (LAN) 452 and/or larger networks, e.g., a wide area network (WAN) 454. Such LAN and WAN networking environments are commonplace in offices and companies, and facilitate enterprise-wide computer networks, such as intranets, all of which can connect to a global communications network, e.g., the Internet.

When used in a LAN networking environment, the computer 402 can be connected to the LAN 452 through a wired and/or wireless communication network interface or adapter 456. The adapter 456 can facilitate wired or wireless communication to the LAN 452, which can also comprise a wireless AP disposed thereon for communicating with the adapter 456.

When used in a WAN networking environment, the computer 402 can comprise a modem 458 or can be connected to a communications server on the WAN 454 or has other means for establishing communications over the WAN 454, such as by way of the Internet. The modem 458, which can be internal or external and a wired or wireless device, can be connected to the system bus 408 via the input device interface 442. In a networked environment, program modules depicted relative to the computer 402 or portions thereof, can be stored in the remote memory/storage device 450. It will be appreciated that the network connections shown are example and other means of establishing a communications link between the computers can be used.

The computer 402 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This can comprise Wireless Fidelity (Wi-Fi) and BLUETOOTH® wireless technologies.

Thus, the communication can be a predefined structure as with a conventional network or simply an ad hoc communication between at least two devices.

Wi-Fi can allow connection to the Internet from a couch at home, a bed in a hotel room or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE 802.11 (a, b, g, n, ac, ag, etc.) to provide secure, reliable, fast wireless connectivity. A Wi-Fi network can be used to connect computers to each other, to the Internet, and to wired networks (which can use IEEE 802.3 or Ethernet). Wi-Fi networks operate in the unlicensed 2.4 and 5 GHz radio bands for example or with products that contain both bands (dual band), so the networks can provide real-world performance similar to the basic 10BaseT wired Ethernet networks used in many offices.

Figure 5:
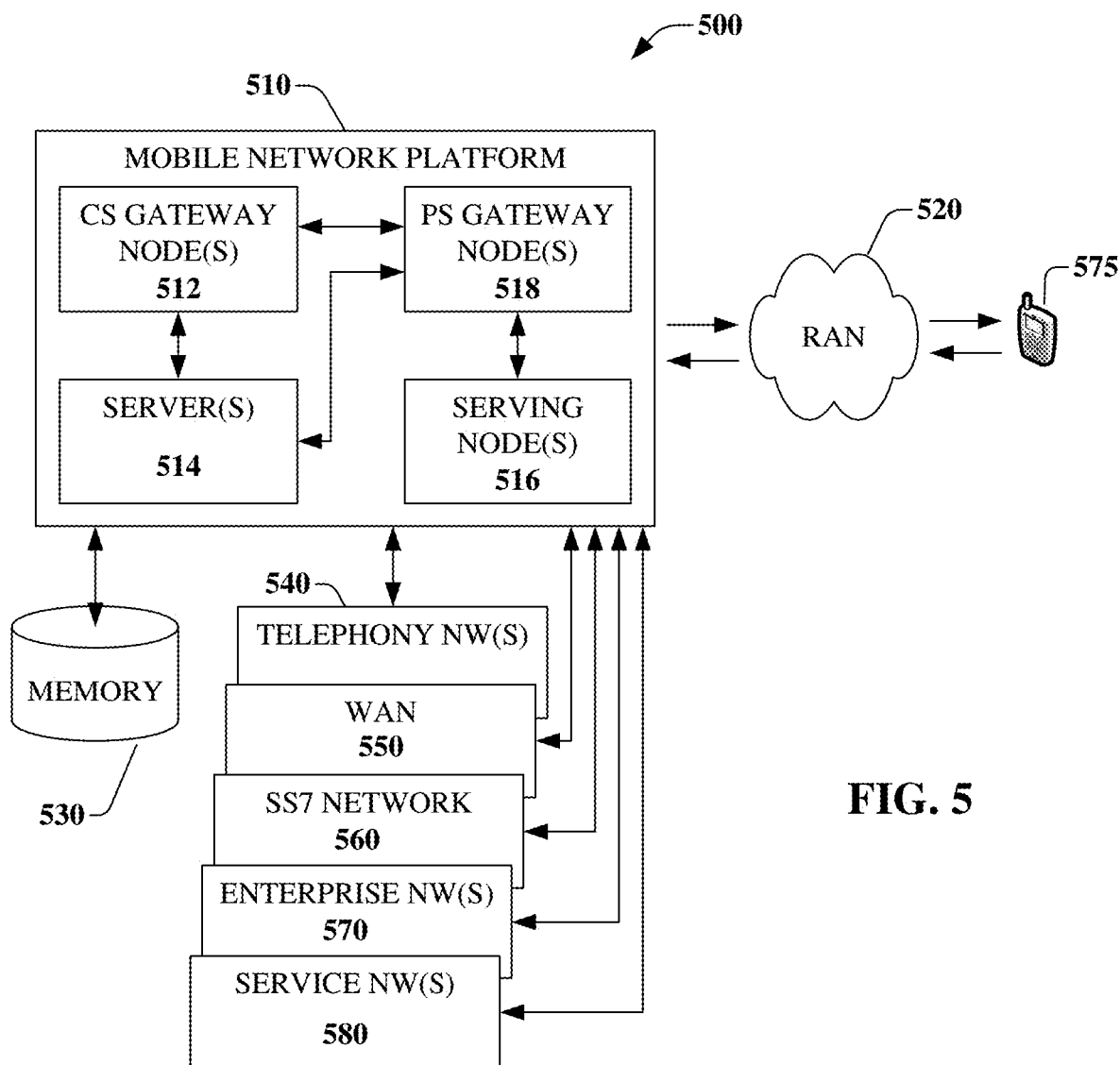
FIG. 5 is a block diagram of an example, non-limiting embodiment of a mobile network platform in accordance with various aspects described herein.

Turning now to FIG. 5, an embodiment 500 of a mobile network platform 510 is shown that is an example of network elements 150, 152, 154, 156, and/or VNEs 330, 332, 334, etc. For example, platform 510 can facilitate in whole or in part requesting smart contracts for tracking a position of a mobile device from a quantum blockchain; issuing tokens for uniquely identifying location data for the position of mobile devices; receiving location data including the token from the mobile device, determining position a mobile device by displacement from an initial position using a quantum accelerometer; verifying location data; and storing location data in a quantum blockchain.

In one or more embodiments, the mobile network platform 510 can generate and receive signals transmitted and received by base stations or access points such as base station or access point 122. Mobile network platform 510 can comprise components, e.g., nodes, gateways, interfaces, servers, or disparate platforms, which facilitate both packet-switched (PS) (e.g., internet protocol (IP), frame relay, asynchronous transfer mode (ATM)) and circuit-switched (CS) traffic (e.g., voice and data), as well as control generation for networked wireless telecommunication. As a non-limiting example, mobile network platform 510 can be included in telecommunications carrier networks and can be considered carrier-side components as discussed elsewhere herein. Mobile network platform 510 comprises CS gateway node(s) 512 which can interface CS traffic received from legacy networks like telephony network(s) 540 (e.g., public switched telephone network (PSTN), or public land mobile network (PLMN)) or a signaling system #7 (SS7) network 560. CS gateway node(s) 512 can authorize and authenticate traffic (e.g., voice) arising from such networks. Additionally, CS gateway node(s) 512 can access mobility, or roaming, data generated through SS7 network 560; for instance, mobility data stored in a visited location register (VLR), which can reside in memory 530. Moreover, CS gateway node(s) 512 interfaces CS-based traffic and signaling and PS gateway node(s) 518. As an example, in a 3GPP UMTS network, CS gateway node(s) 512 can be realized at least in part in gateway GPRS support node(s) (GGSN). It should be appreciated that functionality and specific operation of CS gateway node(s) 512, PS gateway node(s) 518, and serving node(s) 516, is provided and dictated by radio technology (ies) utilized by mobile network platform 510 for telecommunication over a radio access network 520 with other devices, such as a radiotelephone 575.

In addition to receiving and processing CS-switched traffic and signaling, PS gateway node(s) 518 can authorize and authenticate PS-based data sessions with served mobile devices. Data sessions can comprise traffic, or content(s), exchanged with networks external to the mobile network platform 510, like wide area network(s) (WANs) 550, enterprise network(s) 570, and service network(s) 580, which can be embodied in local area network(s) (LANs), can also be interfaced with mobile network platform 510 through PS gateway node(s) 518. It is to be noted that WANs 550 and enterprise network(s) 570 can embody, at least in part, a service network(s) like IP multimedia subsystem (IMS). Based on radio technology layer(s) available in technology resource(s) or radio access network 520, PS gateway node(s) 518 can generate packet data protocol contexts when a data session is established; other data structures that facilitate routing of packetized data also can be generated. To that end, in an aspect, PS gateway node(s) 518 can comprise a tunnel interface (e.g., tunnel termination gateway (TTG) in 3GPP UMTS network(s) (not shown)) which can facilitate packetized communication with disparate wireless network(s), such as Wi-Fi networks.

In embodiment 500, mobile network platform 510 also comprises serving node(s) 516 that, based upon available radio technology layer(s) within technology resource(s) in the radio access network 520, convey the various packetized flows of data streams received through PS gateway node(s) 518. It is to be noted that for technology resource(s) that rely primarily on CS communication, server node(s) can deliver traffic without reliance on PS gateway node(s) 518; for example, server node(s) can embody at least in part a mobile switching center. As an example, in a 3GPP UMTS network, serving node(s) 516 can be embodied in serving GPRS support node(s) (SGSN).

For radio technologies that exploit packetized communication, server(s) 514 in mobile network platform 510 can execute numerous applications that can generate multiple disparate packetized data streams or flows, and manage (e.g., schedule, queue, format . . . ) such flows. Such application(s) can comprise add-on features to standard services (for example, provisioning, billing, customer support . . . ) provided by mobile network platform 510. Data streams (e.g., content(s) that are part of a voice call or data session) can be conveyed to PS gateway node(s) 518 for authorization/authentication and initiation of a data session, and to serving node(s) 516 for communication thereafter. In addition to application server, server(s) 514 can comprise utility server(s), a utility server can comprise a provisioning server, an operations and maintenance server, a security server that can implement at least in part a certificate authority and firewalls as well as other security mechanisms, and the like. In an aspect, security server(s) secure communication served through mobile network platform 510 to ensure network's operation and data integrity in addition to authorization and authentication procedures that CS gateway node(s) 512 and PS gateway node(s) 518 can enact. Moreover, provisioning server(s) can provision services from external network(s) like networks operated by a disparate service provider; for instance, WAN 550 or Global Positioning System (GPS) network(s) (not shown). Provisioning server(s) can also provision coverage through networks associated to mobile network platform 510 (e.g., deployed and operated by the same service provider), such as the distributed antennas networks shown in FIG. 1(s) that enhance wireless service coverage by providing more network coverage.

It is to be noted that server(s) 514 can comprise one or more processors configured to confer at least in part the functionality of mobile network platform 510. To that end, the one or more processors can execute code instructions stored in memory 530, for example. It should be appreciated that server(s) 514 can comprise a content manager, which operates in substantially the same manner as described hereinbefore.

In example embodiment 500, memory 530 can store information related to operation of mobile network platform 510. Other operational information can comprise provisioning information of mobile devices served through mobile network platform 510, subscriber databases; application intelligence, pricing schemes, e.g., promotional rates, flat-rate programs, couponing campaigns; technical specification(s) consistent with telecommunication protocols for operation of disparate radio, or wireless, technology layers; and so forth. Memory 530 can also store information from at least one of telephony network(s) 540, WAN 550, SS7 network 560, or enterprise network(s) 570. In an aspect, memory 530 can be, for example, accessed as part of a data store component or as a remotely connected memory store.

In order to provide a context for the various aspects of the disclosed subject matter, FIG. 5, and the following discussion, are intended to provide a brief, general description of a suitable environment in which the various aspects of the disclosed subject matter can be implemented. While the subject matter has been described above in the general context of computer-executable instructions of a computer program that runs on a computer and/or computers, those skilled in the art will recognize that the disclosed subject matter also can be implemented in combination with other program modules. Program modules comprise routines, programs, components, data structures, etc. that perform particular tasks and/or implement particular abstract data types.

Figure 6:
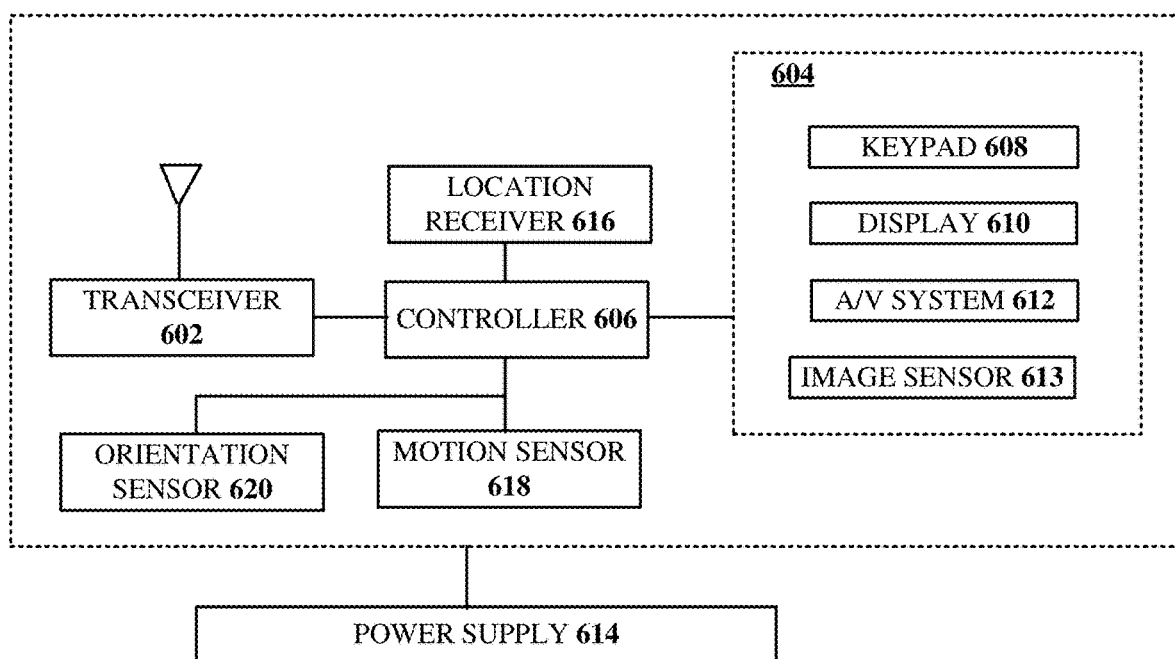
FIG. 6 is a block diagram of an example, non-limiting embodiment of a communication device in accordance with various aspects described herein.

Turning now to FIG. 6, an illustrative embodiment of a communication device 600 is shown. The communication device 600 can serve as an illustrative embodiment of devices such as data terminals 114, mobile devices 124, vehicle 126, display devices 144 or other client devices for communication via either communications network 125. For example, computing device 600 can facilitate in whole or in part requesting smart contracts for tracking a position of a mobile device from a quantum blockchain; issuing tokens for uniquely identifying location data for the position of mobile devices; receiving location data including the token from the mobile device, determining position a mobile device by displacement from an initial position using a quantum accelerometer; verifying location data; and storing location data in a quantum blockchain.

The communication device 600 can comprise a wireline and/or wireless transceiver 602 (herein transceiver 602), a user interface (UI) 604, a power supply 614, a location receiver 616, a motion sensor 618, an orientation sensor 620, and a controller 606 for managing operations thereof. The transceiver 602 can support short-range or long-range wireless access technologies such as Bluetooth®, ZigBee®, Wi-Fi, DECT, or cellular communication technologies, just to mention a few (Bluetooth® and ZigBee® are trademarks registered by the Bluetooth® Special Interest Group and the ZigBee® Alliance, respectively). Cellular technologies can include, for example, CDMA-1X, UMTS/HSDPA, GSM/GPRS, TDMA/EDGE, EV/DO, WiMAX, SDR, LTE, as well as other next generation wireless communication technologies as they arise. The transceiver 602 can also be adapted to support circuit-switched wireline access technologies (such as PSTN), packet-switched wireline access technologies (such as TCP/IP, VoIP, etc.), and combinations thereof.

The UI 604 can include a depressible or touch-sensitive keypad 608 with a navigation mechanism such as a roller ball, a joystick, a mouse, or a navigation disk for manipulating operations of the communication device 600. The keypad 608 can be an integral part of a housing assembly of the communication device 600 or an independent device operably coupled thereto by a tethered wireline interface (such as a USB cable) or a wireless interface supporting for example Bluetooth®. The keypad 608 can represent a numeric keypad commonly used by phones, and/or a QWERTY keypad with alphanumeric keys. The UI 604 can further include a display 610 such as monochrome or color LCD (Liquid Crystal Display), OLED (Organic Light Emitting Diode) or other suitable display technology for conveying images to an end user of the communication device 600. In an embodiment where the display 610 is touch-sensitive, a portion or all of the keypad 608 can be presented by way of the display 610 with navigation features.

The display 610 can use touch screen technology to also serve as a user interface for detecting user input. As a touch screen display, the communication device 600 can be adapted to present a user interface having graphical user interface (GUI) elements that can be selected by a user with a touch of a finger. The display 610 can be equipped with capacitive, resistive or other forms of sensing technology to detect how much surface area of a user's finger has been placed on a portion of the touch screen display. This sensing information can be used to control the manipulation of the GUI elements or other functions of the user interface. The display 610 can be an integral part of the housing assembly of the communication device 600 or an independent device communicatively coupled thereto by a tethered wireline interface (such as a cable) or a wireless interface.

The UI 604 can also include an audio system 612 that utilizes audio technology for conveying low volume audio (such as audio heard in proximity of a human ear) and high-volume audio (such as speakerphone for hands free operation). The audio system 612 can further include a microphone for receiving audible signals of an end user. The audio system 612 can also be used for voice recognition applications. The UI 604 can further include an image sensor 613 such as a charged coupled device (CCD) camera for capturing still or moving images.

The power supply 614 can utilize common power management technologies such as replaceable and rechargeable batteries, supply regulation technologies, and/or charging system technologies for supplying energy to the components of the communication device 600 to facilitate long-range or short-range portable communications. Alternatively, or in combination, the charging system can utilize external power sources such as DC power supplied over a physical interface such as a USB port or other suitable tethering technologies.

The location receiver 616 can utilize location technology such as a global positioning system (GPS) receiver capable of assisted GPS for identifying a location of the communication device 600 based on signals generated by a constellation of GPS satellites, which can be used for facilitating location services such as navigation. The motion sensor 618 can utilize motion sensing technology such as an accelerometer, a gyroscope, or other suitable motion sensing technology to detect motion of the communication device 600 in three-dimensional space. The orientation sensor 620 can utilize orientation sensing technology such as a magnetometer to detect the orientation of the communication device 600 (north, south, west, and east, as well as combined orientations in degrees, minutes, or other suitable orientation metrics).

The communication device 600 can use the transceiver 602 to also determine a proximity to a cellular, Wi-Fi, Bluetooth®, or other wireless access points by sensing techniques such as utilizing a received signal strength indicator (RSSI) and/or signal time of arrival (TOA) or time of flight (TOF) measurements. The controller 606 can utilize computing technologies such as a microprocessor, a digital signal processor (DSP), programmable gate arrays, application specific integrated circuits, and/or a video processor with associated storage memory such as Flash, ROM, RAM, SRAM, DRAM or other storage technologies for executing computer instructions, controlling, and processing data supplied by the aforementioned components of the communication device 600.

Other components not shown in FIG. 6 can be used in one or more embodiments of the subject disclosure. For instance, the communication device 600 can include a slot for adding or removing an identity module such as a Subscriber Identity Module (SIM) card or Universal Integrated Circuit Card (UICC). SIM or UICC cards can be used for identifying subscriber services, executing programs, storing subscriber data, and so on.

The terms "first," "second," "third," and so forth, as used in the claims, unless otherwise clear by context, is for clarity only and does not otherwise indicate or imply any order in time. For instance, "a first determination," "a second determination," and "a third determination," does not indicate or imply that the first determination is to be made before the second determination, or vice versa, etc.

In the subject specification, terms such as "store," "storage," "data store," data storage," "database," and any other information storage component relevant to operation and functionality of a component, refer to "memory components," or entities embodied in a "memory" or components comprising the memory. It will be appreciated that the memory components described herein can be either volatile memory or nonvolatile memory, or can comprise both volatile and nonvolatile memory, by way of illustration, and not limitation, volatile memory, non-volatile memory, disk storage, and memory storage. Further, nonvolatile memory can be included in read only memory (ROM), programmable ROM (PROM), electrically programmable ROM (EPROM), electrically erasable ROM (EEPROM), or flash memory. Volatile memory can comprise random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to comprise, without being limited to comprising, these and any other suitable types of memory.

Moreover, it will be noted that the disclosed subject matter can be practiced with other computer system configurations, comprising single-processor or multiprocessor computer systems, mini-computing devices, mainframe computers, as well as personal computers, hand-held computing devices (e.g., PDA, phone, smartphone, watch, tablet computers, netbook computers, etc.), microprocessor-based or programmable consumer or industrial electronics, and the like. The illustrated aspects can also be practiced in distributed computing environments where tasks are performed by remote processing devices that are linked through a communications network; however, some if not all aspects of the subject disclosure can be practiced on stand-alone computers. In a distributed computing environment, program modules can be located in both local and remote memory storage devices.

In one or more embodiments, information regarding use of services can be generated including services being accessed, media consumption history, user preferences, and so forth. This information can be obtained by various methods including user input, detecting types of communications (e.g., video content vs. audio content), analysis of content streams, sampling, and so forth. The generating, obtaining and/or monitoring of this information can be responsive to an authorization provided by the user. In one or more embodiments, an analysis of data can be subject to authorization from user(s) associated with the data, such as an opt-in, an opt-out, acknowledgement requirements, notifications, selective authorization based on types of data, and so forth.

Some of the embodiments described herein can also employ artificial intelligence (AI) to facilitate automating one or more features described herein. The embodiments (e.g., in connection with automatically identifying acquired cell sites that provide a maximum value/benefit after addition to an existing communication network) can employ various AI-based schemes for conducting various embodiments thereof. Moreover, the classifier can be employed to determine a ranking or priority of each cell site of the acquired network. A classifier is a function that maps an input attribute vector, $x=(x_1, x_2, x_3, x_4 \ldots x_n)$, to a confidence that the input belongs to a class, that is, $f(x)$ =confidence(class). Such classification can employ a probabilistic and/or statistical-based analysis (e.g., factoring into the analysis utilities and costs) to determine or infer an action that a user desires to be automatically performed. A support vector machine (SVM) is an example of a classifier that can be employed. The SVM operates by finding a hypersurface in the space of possible inputs, which the hypersurface attempts to split the triggering criteria from the non-triggering events. Intuitively, this makes the classification correct for testing data that is near, but not identical to training data. Other directed and undirected model classification approaches comprise, e.g., naïve Bayes, Bayesian networks, decision trees, neural networks, fuzzy logic models, and probabilistic classification models providing different patterns of independence can be employed. Classification as used herein also is inclusive of statistical regression that is utilized to develop models of priority.

As will be readily appreciated, one or more of the embodiments can employ classifiers that are explicitly trained (e.g., via a generic training data) as well as implicitly trained (e.g., via observing UE behavior, operator preferences, historical information, receiving extrinsic information). For example, SVMs can be configured via a learning or training phase within a classifier constructor and feature selection module. Thus, the classifier(s) can be used to automatically learn and perform a number of functions, including but not limited to determining according to predetermined criteria which of the acquired cell sites will benefit a maximum number of subscribers and/or which of the acquired cell sites will add minimum value to the existing communication network coverage, etc.

As used in some contexts in this application, in some embodiments, the terms "component," "system" and the like are intended to refer to, or comprise, a computer-related entity or an entity related to an operational apparatus with one or more specific functionalities, wherein the entity can be either hardware, a combination of hardware and software, software, or software in execution. As an example, a component may be, but is not limited to being, a process running on a processor, a processor, an object, an executable, a thread of execution, computer-executable instructions, a program, and/or a computer. By way of illustration and not limitation, both an application running on a server and the server can be a component. One or more components may reside within a process and/or thread of execution and a component may be localized on one computer and/or distributed between two or more computers. In addition, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or firmware application executed by a processor, wherein the processor can be internal or external to the apparatus and executes at least a part of the software or firmware application. As yet another example, a component can be an apparatus that provides specific functionality through electronic components without mechanical parts, the electronic components can comprise a processor therein to execute software or firmware that confers at least in part the functionality of the electronic components. While various components have been illustrated as separate components, it will be appreciated that multiple components can be implemented as a single component, or a single component can be implemented as multiple components, without departing from example embodiments.

Further, the various embodiments can be implemented as a method, apparatus or article of manufacture using standard programming and/or engineering techniques to produce software, firmware, hardware or any combination thereof to control a computer to implement the disclosed subject matter. The term "article of manufacture" as used herein is intended to encompass a computer program accessible from any computer-readable device or computer-readable storage/communications media. For example, computer readable storage media can include, but are not limited to, magnetic storage devices (e.g., hard disk, floppy disk, magnetic strips), optical disks (e.g., compact disk (CD), digital versatile disk (DVD)), smart cards, and flash memory devices (e.g., card, stick, key drive). Of course, those skilled in the art will recognize many modifications can be made to this configuration without departing from the scope or spirit of the various embodiments.

In addition, the words "example" and "exemplary" are used herein to mean serving as an instance or illustration. Any embodiment or design described herein as "example" or "exemplary" is not necessarily to be construed as preferred or advantageous over other embodiments or designs. Rather, use of the word example or exemplary is intended to present concepts in a concrete fashion. As used in this application, the term "or" is intended to mean an inclusive "or" rather than an exclusive "or." That is, unless specified otherwise or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Moreover, terms such as "user equipment," "mobile station," "mobile," "subscriber station," "access terminal," "terminal," "handset," "mobile device" (and/or terms representing similar terminology) can refer to a wireless device utilized by a subscriber or user of a wireless communication service to receive or convey data, control, voice, video, sound, gaming or substantially any data-stream or signaling-stream. The foregoing terms are utilized interchangeably herein and with reference to the related drawings.

Furthermore, the terms "user," "subscriber," "customer," "consumer" and the like are employed interchangeably throughout, unless context warrants particular distinctions among the terms. It should be appreciated that such terms can refer to human entities or automated components supported through artificial intelligence (e.g., a capacity to make inference based, at least, on complex mathematical formalisms), which can provide simulated vision, sound recognition and so forth.

As employed herein, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components or any combination thereof designed to perform the functions described herein. Processors can exploit nano-scale architectures such as, but not limited to, molecular and quantum-dot based transistors, switches and gates, in order to optimize space usage or enhance performance of user equipment. A processor can also be implemented as a combination of computing processing units.

As used herein, terms such as "data storage," data storage," "database," and substantially any other information storage component relevant to operation and functionality of a component, refer to "memory components," or entities embodied in a "memory" or components comprising the memory. It will be appreciated that the memory components or computer-readable storage media, described herein can be either volatile memory or nonvolatile memory or can include both volatile and nonvolatile memory.

What has been described above includes mere examples of various embodiments. It is, of course, not possible to describe every conceivable combination of components or methodologies for purposes of describing these examples, but one of ordinary skill in the art can recognize that many further combinations and permutations of the present embodiments are possible. Accordingly, the embodiments disclosed and/or claimed herein are intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

In addition, a flow diagram may include a "start" and/or "continue" indication. The "start" and "continue" indications reflect that the steps presented can optionally be incorporated in or otherwise used in conjunction with other routines. In this context, "start" indicates the beginning of the first step presented and may be preceded by other activities not specifically shown. Further, the "continue" indication reflects that the steps presented may be performed multiple times and/or may be succeeded by other activities not specifically shown. Further, while a flow diagram indicates a particular ordering of steps, other orderings are likewise possible provided that the principles of causality are maintained.

As may also be used herein, the term(s) "operably coupled to," "coupled to," and/or "coupling" includes direct coupling between items and/or indirect coupling between items via one or more intervening items. Such items and intervening items include, but are not limited to, junctions, communication paths, components, circuit elements, circuits, functional blocks, and/or devices. As an example of indirect coupling, a signal conveyed from a first item to a second item may be modified by one or more intervening items by modifying the form, nature or format of information in a signal, while one or more elements of the information in the signal are nevertheless conveyed in a manner than can be recognized by the second item. In a further example of indirect coupling, an action in a first item can cause a reaction on the second item, as a result of actions and/or reactions in one or more intervening items.

Although specific embodiments have been illustrated and described herein, it should be appreciated that any arrangement which achieves the same or similar purpose may be substituted for the embodiments described or shown by the subject disclosure. The subject disclosure is intended to cover any and all adaptations or variations of various embodiments. Combinations of the above embodiments, and other embodiments not specifically described herein, can be used in the subject disclosure. For instance, one or more features from one or more embodiments can be combined with one or more features of one or more other embodiments. In one or more embodiments, features that are positively recited can also be negatively recited and excluded from the embodiment with or without replacement by another structural and/or functional feature. The steps or functions described with respect to the embodiments of the subject disclosure can be performed in any order. The steps or functions described with respect to the embodiments of the subject disclosure can be performed alone or in combination with other steps or functions of the subject disclosure, as well as from other embodiments or from other steps that have not been described in the subject disclosure. Further, more than or less than all of the features described with respect to an embodiment can also be utilized.

What is claimed is:

1. A device, comprising:
a processing system including a processor; and
a memory that stores executable instructions that, when executed by the processing system, facilitate performance of operations, the operations comprising:
receiving a smart contract for tracking a position of a mobile device from a quantum blockchain;
issuing a token uniquely identifying location data for the position of the mobile device;
receiving location data including the token from the mobile device, wherein the position of the mobile device is determined by displacement from an initial position using a quantum accelerometer;
verifying the location data using the token; and
storing the location data in the quantum blockchain.

2. The device of claim 1, wherein the operations further comprise: fixing the initial position of the mobile device.

3. The device of claim 2, wherein the initial position is determined by downlink time difference of arrival, uplink time difference of arrival, downlink angle of departure, uplink angle of departure, multi-cell round trip time, enhanced cell ID, downlink reference signal reference power, downlink reference signal time difference, global positioning system, quantum positioning system, or a combination thereof.

4. The device of claim 1, wherein the location data comprises: environmental data, climate data, photo/video data, transportation data, human mobility data, social data, or a combination thereof.

5. The device of claim 1, wherein the location data comprises latitude, longitude and height above terrain.

6. The device of claim 5, wherein the location data comprises pitch, yaw and rotation.

7. The device of claim 6, wherein the location data is compatible with tracking the mobile device in a Space-Air-Ground-Integrated-Network (SAGIN) environment.

8. The device of claim 1, wherein the operations further comprise: receiving updated location data from the mobile device, verifying the updated location data using the token; and storing the updated location data in the quantum blockchain.

9. The device of claim 8, wherein the updated location data comprises a new position for the mobile device, wherein the new position is determined by the quantum accelerometer.

10. The device of claim 9, wherein the device comprises a quantum clock and wherein the operations further comprise synchronizing the quantum clock with a reference clock.

11. The device of claim 10, wherein the quantum clock is synchronized with the reference clock by quantum entanglement.

12. The device of claim 1, wherein the processing system comprises a plurality of processors operating in a distributed computing environment.

13. A non-transitory, machine-readable medium, comprising executable instructions that, when executed by a processing system including a processor, facilitate performance of operations, the operations comprising:
receiving a smart contract for tracking a position of a mobile device from a quantum blockchain;
issuing a token uniquely identifying location data for the position of the mobile device;
fixing an initial position of the mobile device;
receiving location data including the token from the mobile device, wherein the position of the mobile device is determined by displacement from the initial position using a quantum accelerometer;
verifying the location data using the token; and
storing the location data in the quantum blockchain.

14. The non-transitory, machine-readable medium of claim 13, wherein the initial position is determined by downlink time difference of arrival, uplink time difference of arrival, downlink angle of departure, uplink angle of departure, multi-cell round trip time, enhanced cell ID, downlink reference signal reference power, downlink reference signal time difference, global positioning system, quantum positioning system, or a combination thereof.

15. The non-transitory, machine-readable medium of claim 14, wherein the operations further comprise:

receiving updated location data from the mobile device;

verifying the updated location data using the token; and storing the updated location data in the quantum blockchain.

16. The non-transitory, machine-readable medium of claim 15, wherein the location data comprises latitude, longitude and height above terrain.

17. The non-transitory, machine-readable medium of claim 16, wherein the location data comprises pitch, yaw and rotation.

18. The non-transitory, machine-readable medium of claim 17, wherein the processing system comprises a plurality of processors operating in a distributed computing environment.

19. A method, comprising:

requesting, by a processing system including a processor, a smart contract for tracking a position of a mobile device from a quantum blockchain;

issuing, by the processing system, a token uniquely identifying location data for the position of the mobile device responsive to receiving the smart contract;

receiving, by the processing system, the location data including the token from the mobile device, wherein the position of the mobile device is determined by displacement from an initial position using a quantum accelerometer;

verifying, by the processing system, the location data using the token; and storing, by the processing system, the location data in the quantum blockchain.

20. The method of claim 19, further comprising:

receiving, by the processing system, updated location data from the mobile device;

verifying, by the processing system, the updated location data using the token; and storing, by the processing system, the updated location data in the quantum blockchain.

* * * * *